(12) United States Patent
Scherzinger et al.

(10) Patent No.: US 12,290,419 B2
(45) Date of Patent: May 6, 2025

(54) ATTACHMENT BRUSH DEVICE

(71) Applicant: TRISA HOLDING AG, Triengen (CH)

(72) Inventors: Stefan Scherzinger, Willisau (CH); Fabian Keller, Sursee (CH)

(73) Assignee: TRISA HOLDING AG, Triengen (CH)

( * ) Notice: Subject to any disclaimer, the term of this patent is extended or adjusted under 35 U.S.C. 154(b) by 324 days.

(21) Appl. No.: 17/799,800

(22) PCT Filed: Feb. 15, 2021

(86) PCT No.: PCT/EP2021/053626
§ 371 (c)(1),
(2) Date: Aug. 15, 2022

(87) PCT Pub. No.: WO2021/165196
PCT Pub. Date: Aug. 26, 2021

(65) Prior Publication Data
US 2023/0090544 A1 Mar. 23, 2023

(30) Foreign Application Priority Data
Feb. 17, 2020 (EP) .................................. 20157718

(51) Int. Cl.
*A46B 13/02* (2006.01)
*A61C 17/22* (2006.01)
*A61C 17/34* (2006.01)

(52) U.S. Cl.
CPC ............ *A61C 17/222* (2013.01); *A46B 13/02* (2013.01); *A61C 17/34* (2013.01)

(58) Field of Classification Search
CPC ........... A61C 17/22; A61C 17/34; A46B 9/04; A46B 13/02
See application file for complete search history.

(56) References Cited

U.S. PATENT DOCUMENTS 8,365,335 B2 * 2/2013 Fischer ................ A46B 5/0095
15/22.4
8,875,335 B2 * 11/2014 Kloster .............. A61C 17/3418
15/22.1
(Continued)

FOREIGN PATENT DOCUMENTS

DE 102012006723 A1 10/2013
EP 1023001 B1 12/2003
(Continued)

OTHER PUBLICATIONS

Aug. 6, 2020 Search Report issued in European Patent Application No. 20157718.6.
(Continued)

*Primary Examiner* — Michael D Jennings
(74) *Attorney, Agent, or Firm* — Oliff PLC

(57) ABSTRACT

A plug-on brush device for a toothbrush handpiece, in particular for an electrical toothbrush handpiece, with an application unit including a head section with a brush head, a plug-on section and a neck section that is arranged between the head section and the plug-on section, and with an interface accommodation unit which is configured to receive at least one interface of a toothbrush handpiece, wherein the interface accommodation unit is realized separately and the plug-on section of the application unit includes a receiving region for receiving the interface accommodation unit at least substantially completely in a loss-proof manner.

13 Claims, 10 Drawing Sheets

(56) References Cited

U.S. PATENT DOCUMENTS

Figure 1:
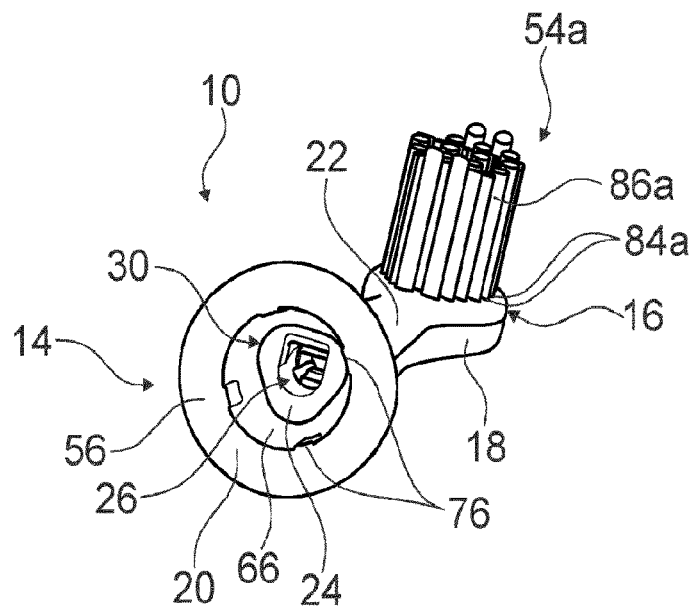

| | | | |
|---|---|---|---|
| 9,572,642 B2* | 2/2017 | Fischer | A61C 17/349 |
| 9,724,180 B1 | 8/2017 | Liu | |
| 10,433,940 B2* | 10/2019 | Wu | A46B 9/04 |
| 10,828,137 B2* | 11/2020 | Sokol | A61C 17/02 |
| 2001/0014990 A1 | 8/2001 | Fritsch et al. | |
| 2002/0035761 A1 | 3/2002 | Fritsch et al. | |
| 2004/0010872 A1* | 1/2004 | Chiang | A61C 17/34 15/28 |
| 2005/0102773 A1* | 5/2005 | Obermann | A61C 17/3418 15/4 |
| 2005/0108838 A1 | 5/2005 | Schaefer et al. | |
| 2007/0214587 A1* | 9/2007 | Stoeffler | A61C 17/225 15/22.1 |
| 2009/0183324 A1* | 7/2009 | Fischer | A61C 17/3454 15/22.1 |
| 2011/0083288 A1 | 4/2011 | Kressner | |
| 2011/0107536 A1* | 5/2011 | Dabrowski | A61C 17/222 15/167.1 |
| 2019/0174905 A1* | 6/2019 | Bloch | A61C 17/3481 |
| 2019/0175322 A1* | 6/2019 | Bloch | A61C 17/34 |

FOREIGN PATENT DOCUMENTS

| | | |
|---|---|---|
| EP | 1682032 B1 | 2/2009 |
| EP | 2135580 A1 | 12/2009 |
| EP | 2234561 B1 | 8/2012 |
| WO | 00/76420 A1 | 12/2000 |
| WO | 2016/001831 A1 | 1/2016 |
| WO | 2018/114638 A1 | 6/2018 |

OTHER PUBLICATIONS

Oct. 20, 2020 Search Report issued in European Patent Application No. 20157718.6.

Aug. 20, 2021 International Search Report issued in International Patent Application No. PCT/EP2021/053626.

Aug. 23, 2022 International Preliminary Report on Patentability issued in International Patent Application No. PCT/EP2021/053626.

* cited by examiner

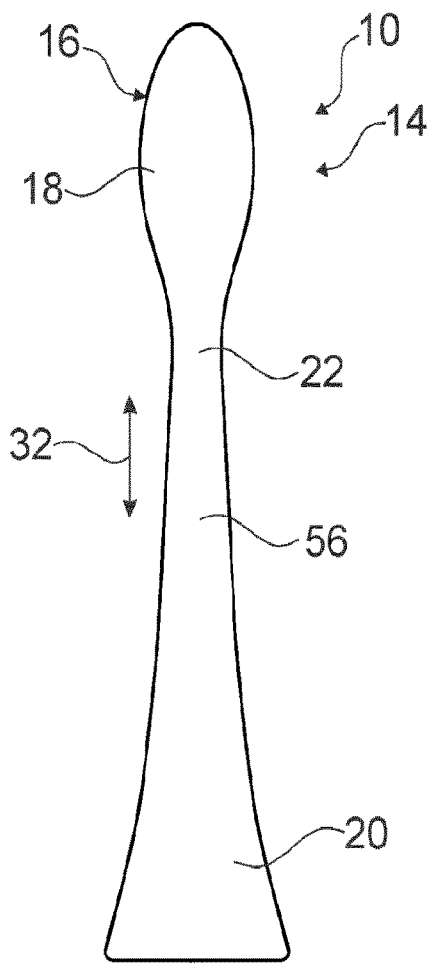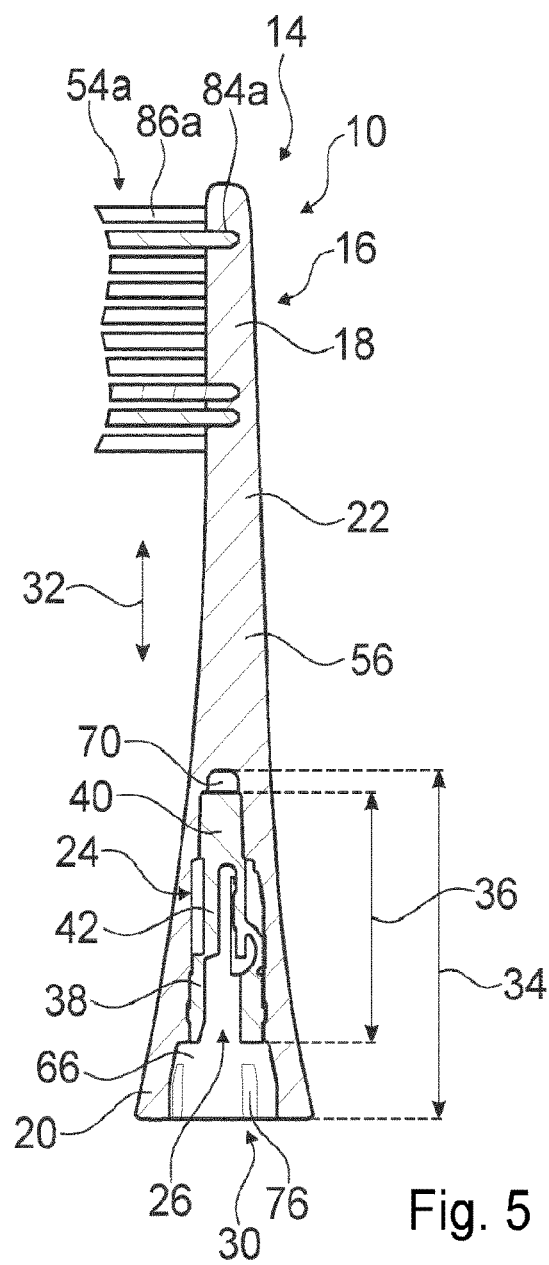
Fig. 4
Fig. 5

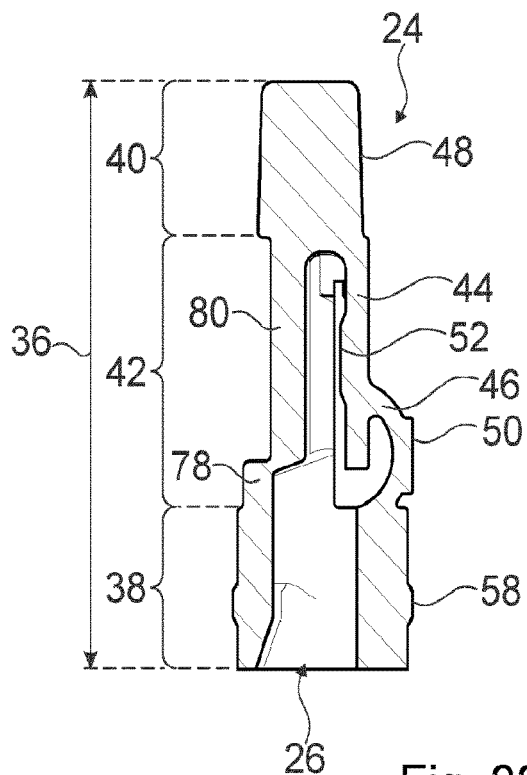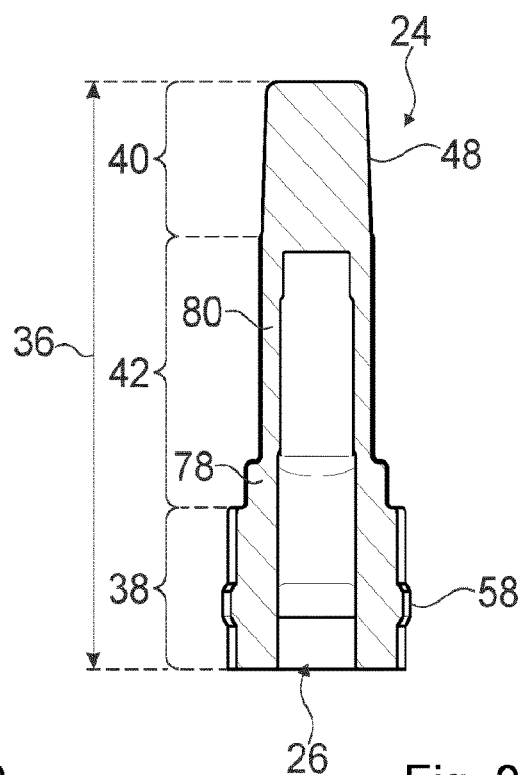
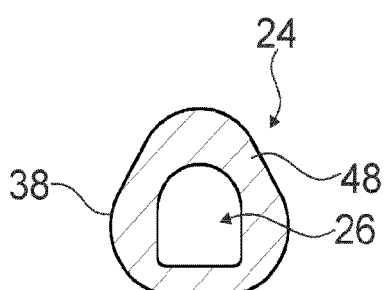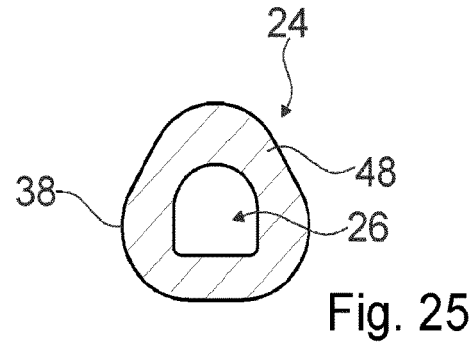
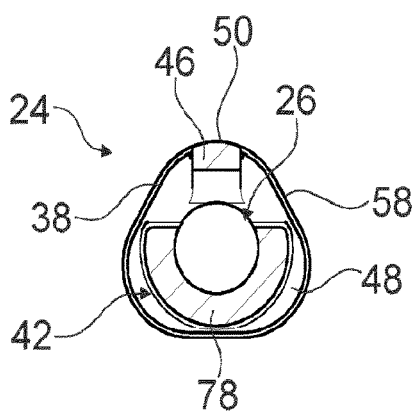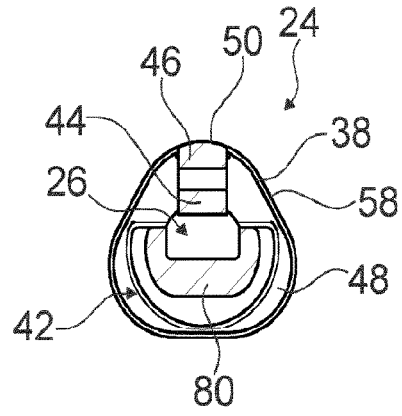

ATTACHMENT BRUSH DEVICE

CROSS REFERENCE TO RELATED APPLICATIONS

This application is based on and incorporates herein by reference the European patent application EP 20157718.6 filed on Feb. 17, 2020 as well as the PCT application PCT/EP2021/053626 filed on Feb. 15, 2021.

PRIOR ART

The invention concerns a plug-on brush device for a toothbrush handpiece, in particular for an electrical toothbrush handpiece or for a manual toothbrush handpiece. The invention further concerns bristle field implementations for plug-on brush devices.

A plug-on brush device for a toothbrush handpiece has already been proposed, with an application unit comprising a head section that has a brush head, a plug-on section and a neck section that is arranged between the head section and the plug-on section, and with an interface accommodation unit which is configured to receive at least one interface of a toothbrush handpiece.

In particular from WO 2016/001831 A1, from EP 1 023 001 B1, from EP 1 682 032 B1, from U.S. Pat. No. 9,724,180 B1, from EP 2 234 561 B1, from US 2011/0107536 A1, from DE 10 2012 006 723 A1 and from EP 3 558 158 A1 plug-on brush devices for a toothbrush handpiece are already known.

The objective of the invention is in particular to provide a generic device having improved characteristics regarding variability and reliability. The objective is attained according to the invention by the features of patent claim 1 while advantageous implementations and further developments of the invention may be gathered from the subclaims.

Advantages of the Invention

The invention is based on a plug-on brush device for a toothbrush handpiece, in particular for an electrical toothbrush handpiece, with an application unit comprising a head section that has a brush head, a plug-on section and a neck section that is arranged between the head section and the plug-on section, and with an interface accommodation unit which is configured to receive at least one interface of a toothbrush handpiece.

It is proposed that the interface accommodation unit is realized separately and the plug-on section of the application unit comprises a receiving region for receiving the interface accommodation unit at least substantially completely in a loss-proof manner. The plug-on brush device is in particular realized by a plug-on brush. The plug-on brush device is in particular realized by a plug-on brush for an exchangeable-head toothbrush, in particular of an electrical toothbrush. In regard to electrical toothbrushes in particular oscillating movements, pivoting movements, translational movements, vibrating movements and/or combined, superimposed movements are known. Combined, respectively superimposed, movements may be composed of oscillating movements, pivoting movements, translational movements, vibrating movements of the plug-on brush. The toothbrush handpiece is in particular realized by a pivoting electrical toothbrush, which means that the plug-on brush with the brush head pivots and/or oscillates around an axis that is parallel to the longitudinal axis of the interface and/or of a drive axis. Alternatively, the plug-on brush device could be configured for a coupling with a rotating, oscillating electrical toothbrush, which means that the brush head rotates and/or oscillates around an axis that is perpendicular to the longitudinal axis of the interface and/or to a drive axis. In this implementation variant, the interface accommodation unit should be supplemented with a functional geometry, in particular in front. In particular, all the parts should be configured for the transformation of the oscillating longitudinal pivot movement into a pivot movement perpendicularly to the longitudinal axis of the interface. Alternatively, the plug-on brush device could be configured for an exchange system for manual toothbrushes. A drive of the toothbrush handpiece may hence be effected in particular mechanically, by an electromotor plus gear unit, by an oscillating armature (an oscillating magnetic drive without a gear unit) and/or by an electromotor. It is however also conceivable that the application unit is implemented differently than the brush head, like for example as an interdental cleaning head, like in particular for an interdental brush with twisted-in bristles, for an interdental cleaner with injection-molded cleaning elements and/or for interdental cleaners with dental floss, like in particular flossers, and/or as a tongue cleaner head and/or as a toothpick. The plug-on brush device could however also be realized by a plug-on brush of a brush product. A "brush product" is in particular to mean an oral hygiene brush and/or a cosmetic brush and/or a hairbrush, and/or a household brush. For example, manual toothbrushes, like multi-use toothbrushes, exchangeable-head toothbrushes, one-way toothbrushes or single-tuft brushes, interdental cleaners, in particular with twisted-in bristles, injection-molded or as flossers, tongue cleaners and/or dental floss, are conceivable as oral hygiene brushes. For cosmetic brushes, for example mascara brushes, nail polish brushes, face brushes, applicators, in particular hair-dye applicators, massaging apparatuses, makeup brushes, makeup sponges, highlight brushes, hairbrushes, shaving brushes and/or wet shavers, or other body-care products are conceivable. For household brushes, for example dishwashing brushes or bottle cleaners are conceivable.

The head section is in particular arranged at a front end of the application unit. The head section in particular comprises a brush head with a bristle field, a tongue cleaner, or the like. The bristle field may in particular be realized in different ways, like in particular with transversal rows, in a longitudinal direction with two deepenings, in the middle of an elevation as well as at the ends of respectively one elevation or in a transversal direction, in particular perpendicularly to the longitudinal axis of the application unit, free of a profiling, i.e. in particular with a straight cut. Alternatively it would be conceivable that the bristle field has an adaption to the tooth shape and/or to the application at the teeth. This may be the case, for example, for elongate brush heads with a profiling having in a main extension direction, at the ends of the bristle field, respectively one elevation as a termination, in the middle in-between there is basically a deepening and in a transversal direction there is also a deepening realized, such that the entire bristle field, respectively the profile of the bristle field, has a tub-like hollow. A further example of a bristle field is shaped like described above but has an elevation in the deepening, such that in a side view another elevation is visible. It would furthermore be conceivable that the bristle field comprises soft elements. The soft elements may in particular be shaped from the soft component that is used for the remaining product.

The application unit in particular has a broad rear end, having a continuous progression to the head section via the neck section. Along a main extension direction, the application unit in particular has a progression with a large width in the region of the plug-on section to a narrowing in the neck section and then to a greater width in the head section, in particular viewed in a plane perpendicularly to the longitudinal axis. The outer shape of the application unit in particular has a continuous progression. The application unit in particular has a roundish shape without steps. The outer shape of the application unit is in particular adapted to an outer geometry of the toothbrush handpiece or of a handle. In particular, an outer geometry of the toothbrush handpiece or of a handle is at least partially continued in the outer geometry of the application unit. The application unit in particular has a total length of 60 mm to 100 mm, preferably of 75 mm to 90 mm. A rear end of the application unit, in particular in a region of the plug-on section and/or of the neck section, is in particular substantially rotationally symmetrical or at least mirror-symmetrical with respect to the longitudinal axis of the interface, wherein a smooth transition takes place from the neck section toward the head section, with the rotational symmetry getting lost. In the longitudinal direction the application unit in particular has a progression with a continuous transition to the neck section as well as to the head section. A diameter of the application unit, in particular a maximal height and a maximal width of the application unit, is in particular in a range from 13 mm to 21 mm, preferably from 16 mm to 19 mm. The neck section of the application unit in particular realizes a minimal width, which in particular amounts from 4 mm to 7 mm, preferably from 4.5 mm to 5.5 mm. In particular, a minimal height of the application unit cannot be defined precisely as there is a progression from the rear end and a minimal height is in particular given at the front end of the head section. A narrowest point of the neck section is in particular given in the region of the transition from the neck section to the head section. The transition between the neck section and the head section in particular realizes a waist with a minimal diameter. The head section in particular has a narrow, long, in particular oval, basic shape. The head section in particular has contiguous transitions and therefore neither sharp edges nor leaps, as otherwise there would in particular be danger of injuries. In parallel and/or perpendicularly to the main extension direction, the head section may in particular be implemented in a flat fashion, having a constant dimension and a constant head thickness, with a general wave shape and with a thickness increasing toward the neck section. Additional functional elements, like for example tongue cleaners, may further influence said dimension. Perpendicularly to the bristle direction, the head section is preferably oval, there being in particular a region that has a maximal width. The head section is in particular implemented in a roundish fashion perpendicularly to the bristle direction, such that there are no sharp edges and/or transitions. As the head section is directly in the mouth during application, a danger of injuries should be excluded as far as possible. The head section in particular has a maximal width of 7 mm to 15 mm, preferably of 9 mm to 13 mm. Furthermore, the head section in particular has a length of 20 mm to 35 mm, preferably of 22 mm to 28 mm. Furthermore, the head section in particular has a thickness of 3 mm to 7 mm, preferably of 3.5 mm to 5.5 mm. Moreover, additional variants of the head section are conceivable. In particular, the head section may comprise a tongue cleaner on its rear side. The tongue cleaner may in particular be realized in hard components and/or in soft components. If the tongue cleaner is realized in soft component, it would in particular be conceivable that the soft components are, for example, implemented in a ring around an island made of a hard component, or that the tongue cleaner is realized in a bed of soft components. In the case of an implementation in hard and soft component, it would in particular be conceivable that the tongue cleaner is implemented of both components, for example on a ring and on an island. The tongue cleaner may in particular have different shapes deemed expedient by someone skilled in the art, like for example nubs, lamellae arranged in circles and/or lamellae arranged in longitudinal or transversal stripes, or straight shapes or wave shapes, or the like. Preferably, with the tongue cleaner surface structures are formed whose extension is mostly substantially perpendicular to their movement direction. Preferably surface structures are provided which extend substantially in the longitudinal direction of the head section.

The application unit, in particular the head section of the application unit, is preferably configured for a direct contact with a user's oral cavity. All sub-elements of the application unit may be implemented of at least one hard component and/or one or several soft component/s. Customary hard and/or soft components as well as sustainable hard and/or soft components are applicable. The application unit is in particular made at least largely of a synthetic material, in particular a hard component, or of an organic material like wood or bamboo. The application unit is in particular realized by a plug-on part.

In the context of the present disclosure almost any hard components and soft components are possible, which will be purposefully combined and/or selected by someone skilled in the art in an appropriate manner. For example, styrene polymerizates are possible for a hard component, like styrene acrylonitrile (SAN), polystyrene (PS), acrylonitrile butadiene styrene (ABS), styrene methyl methacrylate (SMMA), styrene butadiene (SB) or the like. Furthermore, a hard component may comprise polyolefins like polypropylene (PP), polyethylene (PE) or the like, in particular also in the form of high-density polyethylene (HDPE) or low-density polyethylene (LDPE). Furthermore polyesters are possible, like for example polyethylene terephthalate (PET), in particular in the form of acid-modified polyethylene terephthalate (PETA), glycol-modified polyethylene terephthalate (PETG), polybutylene terephthalate (PBT), acid-modified polycyclohexylene dimethylene terephthalate (PCT-A), glycol-modified polycyclohexylene dimethylene terephthalate (PCT-G) or the like. Moreover, using cellulose derivates, like for example cellulose acetate (CA), cellulose acetobutyrate (CAB), cellulose propionate (CP), cellulose acetate phthalate (CAP), cellulose butyrate (CB) or the like, is conceivable. A hard component may also comprise polyamides (PA) like PA 6.6, PA 6.10, PA 6.12 or the like, polymethylmethacrylate (PMMA), polycarbonate (PC), polyoxymethylene (POM), polyvinyl chloride (PVC), polyurethane (PUR), polyamide (PA), or the like. In particular polyethylene (PE) and/or polyurethane (PUR) are/is applicable as a hard component and/or as a soft component. In particular, a hard component has an elasticity modulus of at least 1,000 N/mm$^2$ and advantageously of at least 1,300 N/mm$^2$, and/or of at most 2,400 N/mm$^2$ and advantageously of at most 1,800 N/mm$^2$. Preferentially polypropylene (PP) is used as a hard component. At least some of the materials mentioned for the hard component may be sustainable materials. In particular, materials having a cellulose content are at least partially bio-based.

Advantageously, hard components are used for stable and/or structure-bearing elements, in particular in a carrier element of the application unit and/or of the interface receiving unit and/or similar. Preferably the application unit comprises a single hard component, which may be made of one of the materials mentioned or of a mixture or of a combination of said materials. However, combinations of different hard components are also conceivable, wherein these may be processed for example in a two-component and/or multi-component injection molding procedure and/or may be glued and/or welded, in particular ultra-sound welded. Alternatively or additionally, several hard components may be used, which do not enter a material connection in a two-component and/or multi-component injection molding procedure. It is in particular conceivable that in such a case a form-fit connection is created between hard components, which is for example implemented as at least one undercut and/or at least one breakthrough and/or at least one at least partial overmold, or the like. It is herein conceivable that for example a second hard component, which is in particular injection-molded onto a first hard component, dwindles and/or shrinks after injection-molding, advantageously forming a shrinkage connection. Suitable combinations may be, for example, polypropylene-polyester, polypropylene-styrene acrylonitrile, or other combinations. The materials mentioned for the hard component may be biosynthetic materials and/or sustainable materials.

In addition to the hard component(s) mentioned, one or several soft component(s) may be used. For example, thermoplastic styrene elastomers (TPE-S) are conceivable, like a styrene-ethylene-butylene-styrene copolymer (SEBS), a styrene-butadiene-styrene copolymer (SBS) or the like. Moreover, using thermoplastic polyurethane elastomers (TPE-U), thermoplastic polyamide elastomers (TPE-A), thermoplastic polyolefin elastomers (TPE-O), thermoplastic polyester elastomers (TPE-E) or the like is conceivable. For example, a soft component may also comprise at least one silicone. Advantageously a soft component has a Shore A hardness of maximally 90, advantageously of maximally 50 and especially advantageously of maximally 30. Preferably at least one soft component generates at least a material connection with at least one hard component, in particular in at least one two-component and/or multi-component injection molding procedure, advantageously by means of at least overmolding and/or molding around. The materials named for the soft component may be bio-synthetic and/or sustainable materials.

An "interface accommodation" is in particular to mean, in this context, a receiving region of the plug-on brush device that is configured for a loss-proof accommodation of an interface, in particular an axis of the interface, of the toothbrush handpiece. Preferably the interface accommodation is in particular configured for a force-fit and/or form-fit accommodation of the interface. The interface accommodation in particular forms a receiving region in which the interface of the toothbrush handpiece can be inserted wherein the interface gets latched and/or jammed in the receiving region by means of a force-fit and/or form-fit connection, in particular above a defined insertion force. Preferably the interface accommodation is arranged on a side of the plug-on brush device that faces away from the brush head. "Configured" is in particular to mean specifically programmed, designed and/or equipped. By an object being configured for a certain function is in particular to be understood that the object fulfills and/or executes said certain function in at least one application state and/or operation state.

By "the interface accommodation unit being realized separately" is in particular to be understood, in this context, that the interface accommodation unit is embodied by a separate structural component. Preferably, after assembly the interface accommodation unit is connected to the application unit merely in a form-fit and/or force-fit manner. Herein "connected in a form-fit and/or force-fit manner" in particular means a releasable connection wherein a holding force between two structural components is preferably transmitted by geometric engagement of the structural components into each other and/or by a friction force between the structural components. Alternatively, other connection methods may be made use of, like for example ultrasound welding, friction welding, gluing. By the receiving region being configured for "at least substantially completely receiving the interface accommodation unit" is in particular to be understood that in an assembled state of the interface accommodation unit at least a substantial portion of the interface accommodation unit is enclosed by the application unit. Preferably at least 50%, preferentially at least 70% and especially preferentially at least 90% of the interface accommodation unit are completely enclosed by the application unit in at least one plane. The receiving region of the plug-on section of the application unit in particular has an opening through which the interface accommodation unit is inserted into the receiving region during assembly, wherein the interface accommodation unit is in an assembled state in particular free of an overlap with the opening of the receiving region. Optionally there may be an overlap with the opening of the receiving region, for example if the interface accommodation unit is elongated in such a way that it is visible from an outside. For example, the interface accommodation unit may in this way form a portion of the surface (in an assembled state of the plug-on brush device). The interface accommodation unit is preferably given a different coloring than the application unit. This enables a user's better anticipation of their functions and positions. It is thus moreover possible to distinguish between the application units of several users. The receiving region is in particular formed from a rear end. In particular, the receiving region continues from the rear end of the plug-on section toward the neck section. Preferably the receiving region is arranged in the plug-on section and partly in the neck section. Preferentially the receiving region is oriented toward the rear end of the plug-on brush device and is hence open toward the toothbrush handpiece.

The implementation of the plug-on brush device according to the invention in particular enables an advantageously reliable connection to an interface, respectively to a toothbrush handpiece. In particular, an advantageously robust implementation of the interface accommodation unit is achievable. In particular, the application unit can be used, in particular depending on an inserted interface accommodation unit, for different toothbrush handpieces with different interfaces. In particular, a variable utilization and production of the plug-on brush device is achievable. In this way, in particular an advantageously variable and reliable plug-on brush device can be provided.

The interface accommodation unit in particular has the function of coupling the toothbrush handpiece, respectively the interface of the toothbrush handpiece, with the plug-on brush device. The coupling may herein be brought about in particular with a handle for a manual toothbrush as well as with a handle for an electrical toothbrush. In particular, a uniform interface accommodation unit is attainable for different application units, respectively application units with different bristle fields. This then allows achieving a high diversity of variants of the application unit with the same interface accommodation unit. Alternatively or additionally, furthermore a uniform connection is achievable between the interface accommodation unit and the application unit while using different geometries of the interface of the toothbrush handpiece. The interface accommodation unit thus permits a utilization of different implementations of the interface, and thus the utilization of toothbrush handpieces of different provenance, respectively different manufacturers.

A modification of the interface may thus in particular just lead to modifications at the interface accommodation unit. Furthermore, the interface accommodation unit may advantageously have quite complex geometries as it is molded separately. In particular, complex clamping elements may be formed. Moreover, advantageously the complexity of the interface accommodation unit is not perceived in the application unit of the finished plug-on brush device. It is in particular possible to create contiguous surfaces of the application unit. Furthermore, simple assembly of the plug-on brush device may be enabled.

It is also proposed that the plug-on brush device has a main extension direction, wherein an extent of the receiving region of the plug-on section along the main extension direction is greater, in particular substantially greater, than an extent of the interface accommodation unit along the main extension direction. Preferably, along the main extension direction, an extension range of the interface accommodation unit is situated completely within an extension range of the receiving region of the plug-on section. Alternatively, along the main extension direction the extension range of the interface accommodation unit may get to be situated up to or beyond the toothbrush handpiece-side end of the extension range of the receiving region of the plug-on section along the main extension direction. By a "main extension direction" of an object is herein in particular a direction to be understood which runs parallel to a longest edge of a smallest geometric rectangular cuboid that just still completely encloses the object. "Substantially greater" is in particular to mean, in this context, that a value of the extent of the receiving region is by at least 10%, preferably by at least 20% and particularly preferentially by at least 30% greater than a value of the extent of the interface accommodation unit. This in particular allows achieving an advantageously safe and reliable accommodation of the interface accommodation unit.

Beyond this it is proposed that the interface accommodation unit is realized in a one-part implementation and is made of materials different than the application unit, preferably of different hard components. The material properties of the interface accommodation unit are designed for an assembly in the application unit and for the connection to the interface. The material properties of the application unit are preferably designed with regard to surface quality, flexibility, weight, quality aspects and to the mounting of the bristle field. Preferably the material of the interface accommodation unit has, as compared to a material of a base body of the application unit, a higher, in particular substantially higher, hardness and/or elasticity. Preferably the interface accommodation unit and the base body of the application unit are made of a hard component. The interface accommodation unit is in particular implemented at least largely of a synthetic material. The interface accommodation unit is in particular implemented of POM. The interface accommodation unit in particular has an elasticity modulus of at least 1,800 N/mm$^2$ and advantageously of at least 2,100 N/mm$^2$, and/or of maximally 3,100 N/mm$^2$ and advantageously of no more than 2,800 N/mm$^2$, most preferably of 2,300 N/mm$^2$. The interface accommodation unit is preferentially produced in an injection-molding procedure. In particular, for the interface accommodation unit materials other than synthetics are possible only in a limited manner. Furthermore, for the interface accommodation unit there are in particular no special surface characteristics and/or surface structures provided. The application unit is in particular implemented at least largely, in particular completely, of a hard component, in particular of polypropylene. The application unit is in particular made of a synthetic material, in particular PP. The synthetic material of the application unit in particular has an elasticity modulus of at least 1,000 N/mm$^2$ and advantageously of at least 1,300 N/mm$^2$, and/or of maximally 2,400 N/mm$^2$ and advantageously of maximally 1,800 N/mm$^2$, most preferentially of 1,400 N/mm$^2$. The application unit is in particular produced in an injection-molding procedure. However, a variant made of an organic material, like wood or bamboo, is also conceivable, wherein in particular the same interface accommodation unit could be used. In this way in particular a combination of ecology and functionality would be achievable. A further improvement of ecological aspects could be achieved using biosynthetics/sustainable materials. Herein an application unit made of wood or bamboo could be combined with an interface accommodation unit made of biosynthetics/sustainable materials. Furthermore, of course a combination with the application unit and the interface accommodation unit made of biosynthetics/sustainable materials. The hard component of the interface accommodation unit is harder than the hard component of the application unit. However, the interface is preferably harder than the interface accommodation unit. The hard component of the interface accommodation unit has a higher elasticity modulus than the hard component of the application unit. In the case of breakage, for example by a fall/impact of the device or by overload (e.g. age, continuous operation, faulty handling when connecting, respectively removing, the plug-on brush device to/from the toothbrush handpiece), the connection between the interface accommodation unit and the application unit breaks while the interface accommodation unit remains substantially undamaged. For the purpose of absorbing an overload, the combination of application unit and interface accommodation unit is designed in such a way that the connection breaks at a load of 0.20 Nm to 0.8 Nm, preferably of 0.25 Nm to 0.4 Nm. Preferably, the separate implementation of the interface accommodation unit allows adapting material properties to the requirements of the interface accommodation unit. This in particular allows providing an advantageous interface accommodation unit. It is in particular possible to obtain an advantageously robust implementation of the interface accommodation unit. With a breakage, during usage, in the region of the plug-on brush device, preferably in the interface accommodation unit, it is intentionally avoided that the toothbrush handpiece gets damaged in case of an overload. Thus quasi a predetermined breakage point is created. As described above, the breakage preferably takes place between the interface accommodation unit and the application unit. Still it is also possible that, in the case of a correspondingly heavily loadable interface between an application unit and an interface accommodation unit, the breakage concerns only the interface accommodation unit.

The interface accommodation unit may also be realized in a multi-part implementation. The multi-part implementation may herein be realized such that the parts are joined before insertion in the application unit, for example by latching, gluing, welding, etc. However, it is moreover also possible that the connection is a mere adjoining in a state when mounted in the application unit. Herein, for example, a first portion of the interface accommodation unit may be introduced in the receiving region, a second portion of the interface accommodation unit being introduced afterwards, wherein the first portion adjoins the second portion and the second portion brings about clamping and ensures both portions being held in the application unit. The second portion may then enter into a certain latching with the application unit and may, parallel thereto, enter into a clamping with the first portion of the interface accommodation unit.

The interface accommodation unit in particular has a narrowing, respectively a tapering, in a longitudinal direction, the interface accommodation unit becoming smaller in its cross section toward a front end. This in particular enables a mounting into the receiving region of the application unit. A change in the cross section of the inner geometry of the interface accommodation unit in the longitudinal direction is in particular adapted to an interface of the toothbrush handpiece. The interface accommodation unit in particular comprises a defined interface receiving region for receiving the interface. A total length of the interface accommodation unit is in particular in a range of 18 mm to 35 mm, preferably 20 mm to 5 mm or 30 mm to 35 mm.

Preferably it would be conceivable that the interface accommodation unit is utilized for an electrical toothbrush together with an application unit implemented of an organic material like wood or bamboo. In particular, advantageously a composition of a synthetic material and the organic material could be utilized in the plug-on brush device. The composition of the synthetic material of the interface accommodation unit and the interface, which is in particular implemented of metal, as a metal axle or of a synthetic material, as a synthetics axle, could in particular stay in place. It is therefore in particular possible to achieve a known performance as well as a known stability.

The interface is preferably implemented of metal, and is hence a metal axle. Preferably a steel is used which has favorable corrosion resistance and favorable machinability (free machining steel). For example, a steel 1.4305 may be utilized. The well-defined interface region with a fluting is preferably situated with its front end at a distance from the exit point from the toothbrush handpiece that is between 20 mm and 24 mm, preferably between 20.5 mm and 22 mm. The adaption of the interface accommodation unit of course also allows using other geometries of the interface having different contact points.

It is further proposed that the interface accommodation unit comprises at least one first fixing region, which is configured for a direct contact with the receiving region of the plug-on section, and has an at least approximately triangular cross section. Preferably the first fixing region is configured for a direct form-fit connection with the plug-on section of the application unit. Preferentially the first fixing region is configured for latching with the plug-on section of the application unit in the receiving region of the plug-on section. The first fixing region in particular forms a first zone of the interface accommodation unit. The first fixing region in particular forms a holding zone of the interface accommodation unit. The total length of the first fixing region is in particular in a range from 4 mm to 8 mm, preferably from 5 mm to 7 mm. An outer side of the first fixing region in particular has a substantially triangular cross section with rounded corners. In particular, the first fixing region comprises a protruding ring on its outer side. The ring is in particular realized so as to radially protrude with respect to the basic shape of the first fixing region. The ring in particular serves for a connection between the interface accommodation unit and the plug-on section of the application unit. Viewed in a plane parallel to a main extension direction of the interface accommodation unit, the ring in particular has a cross section that is preferably substantially rectangular. However, other cross-section shapes are also conceivable, like for example trapezoid-shaped or semi-circular. In particular, a shape and a perpendicular wall is provided. In particular, the shape of the ring is adapted to a recess in the receiving region of the plug-on section. Preferably, the ring of the first fixing region of the interface accommodation unit is configured for latching with the plug-on section of the application unit. The ring in particular has a length, in particular an extent parallel to the main extension direction of the interface accommodation unit, of 0.5 mm to 2 mm, preferably of 0.9 mm to 1.5 mm. The ring furthermore in particular has a height, in particular an elevation relative to the basic shape of the first fixing region, of 0.1 mm to 0.7 mm, preferably of 0.2 mm to 0.5 mm. A middle of the elevation of the ring in particular has a distance of 1 mm to 4.5 mm, preferably of 2.5 mm to 3.5 mm, to a free rear end of the interface accommodation unit. The middle of the elevation of the ring is in particular situated after 25% to 65%, preferably after 40% to 60%, of the total length, relative to a length of the first fixing region, measured from the lower edge, i.e. the edge at the free end of the first fixing region. The first fixing region of the interface accommodation unit in particular has an opening for an insertion of the interface, in particular the axle, of the toothbrush handpiece. The first fixing region in particular serves as an insertion opportunity and/or for a centering of the interface accommodation unit.

Moreover, the receiving region of the plug-on section in particular has a second sub-receiving region of the application unit that corresponds to the first fixing region. The second sub-receiving region is in particular implemented by a first orientation region. The second sub-receiving region in particular has a cylindrical shape with a substantially triangular cross section having rounded corners. The second sub-receiving region in particular serves for a first orientation of the interface accommodation unit, in particular in assembly. Furthermore, the second sub-receiving region in particular forms a first connection region. The second sub-receiving region in particular has a circumferential recess, which is realized correspondingly to the ring of the first fixing region of the interface accommodation unit. The protruding ring of the first fixing region of the interface accommodation unit is in particular configured to engage into the recess of the second sub-receiving region of the receiving region of the plug-on section. As a basic shape, the second sub-receiving region in particular has a straight cylinder which the recess is introduced into. The cylindrical basic shape has a triangular cross section with rounded corners. The cylindrical basic shape may have a minimal conicity, respectively tapering, enabling a forming of the recess and/or an unforming. The second sub-receiving region in particular has a length of 4 mm to 8 mm, preferably of 5 mm to 7 mm. The cylindrical basic shape of the second sub-receiving region in particular has a width, in particular measured perpendicularly to the bristles, of 4 mm to 8 mm, preferably of 5 mm to 7 mm. Furthermore, the cylindrical basic shape of the second sub-receiving region in particular has a height, in particular a height measured in the bristle direction, of 5 mm to 9 mm, preferably of 6 mm to 8 mm. The introduced circumferential recess has a width of 0.8 mm to 2 mm, preferably of 1 mm to 1.5 mm. Furthermore, the introduced circumferential recess has a depth of 0.1 mm to 0.7 mm, preferably of 0.2 mm to 0.5 mm. The introduced circumferential recess is realized correspondingly to the ring of the first fixing region of the interface accommodation unit. Viewed in a plane parallel to a main extension direction, the introduced circumferential recess in particular has a rectangular cross-section shape. However, other cross-section shapes are also conceivable, like for example trapezoid-shaped or semi-circular. In particular, a shape with a perpendicular wall is provided. A middle of the introduced circumferential recess is in particular situated, relative to a length of the second sub-receiving region, measured starting from the lower edge, i.e. the edge toward the opening of the second sub-receiving region, after 25% to 65%, preferably after 40% to 60%, of the total length. The recess of the second sub-receiving region is in particular realized so as to be circumferential. However, it would also be conceivable that the recess and/or the ring of the first fixing region are/is interrupted, such that there are for example only two partial regions of the recess and/or of the ring, situated opposed to each other by 180°. This in particular allows attaining an advantageous connection between the interface accommodation unit and the application unit. In particular, advantageous fixing of the interface accommodation unit within the receiving region of the plug-on section is achievable.

It is further proposed that the interface accommodation unit comprises at least one second fixing region, which is spaced apart from the first fixing region, which is configured for a direct contact with the receiving region of the plug-on section, and which has an at least approximately triangular cross section, the cross section of the second fixing region being rotated with respect to the cross section of the first fixing region. The second fixing region is in particular oriented differently than the first fixing region, thus in particular providing a certain rotational securing. The second fixing region in particular forms a third zone of the interface accommodation unit. The second fixing region in particular forms a centering zone. The second fixing region in particular serves for a centering of the interface accommodation unit in the receiving region of the plug-on section. The second fixing region in particular has a total length of 3 mm to 8 mm, preferably of 5 mm to 7 mm. An outer side of the second fixing region in particular has a cylindrical shape with a triangular cross section having rounded corners. The second fixing region is in particular free of an inner recess. An end of the interface of the toothbrush handpiece extends in an accommodated state as far as a rear end at the end of a spring zone. The interface does not engage in the second fixing region.

It is principally possible, in a respective implementation, to swap the first and second fixing regions. The first fixing region would then be arranged in the front region of the interface accommodation unit and the second fixing region would be arranged in the rear region of the interface accommodation unit. It is further possible to arrange the two fixing regions directly side by side, such that the fixing regions would be directly adjacent to each other. The sequence of the arrangement, starting from the front end of the interface accommodation unit, may be realized such that the first fixing region is arranged first and then the second fixing region is arranged, it is however also possible that the second fixing region is arranged first and then the first fixing region is arranged.

Depending on an implementation, only one fixing region may be realized, the further fixing characteristics being realized in a different manner.

It is also possible to combine the fixing regions with each other. In this way the elements realized in the fixing regions can be combined. For example, the combination of the ring and the recess of the first fixing region may be realized in the conus of the second fixing region.

The spring zone is preferably arranged between the first fixing region and the second fixing region. The spring zone connects the first fixing region with the second fixing region.

All in all, the interface accommodation unit in particular has exactly three zones along the main extension direction, namely the holding zone that forms the first fixing region, the spring zone, and the centering zone that forms the second fixing region. The second fixing region in particular ensures an unambiguous orientation of the interface accommodation unit in the receiving region, in particular during assembly. Moreover, the second fixing region in particular serves as a holding region for a firm holding of the interface accommodation unit with respect to the application unit. In the second fixing region, the interface accommodation unit is in particular all-around adjacent to the receiving region of the plug-on section. Beyond this the second fixing region in particular serves for a force transmission and for pressing during assembly. In particular, the receiving region of the plug-on section further comprises a fourth sub-receiving region that corresponds to the second fixing region. The fourth sub-receiving region is in particular implemented by an insertion zone. The fourth sub-receiving region in particular serves for further orientation and rotational securing of the interface accommodation unit, in particular during assembly. The fourth sub-receiving region in particular has a cylindrical shape with a substantially triangular cross section having rounded corners. The cylinder may have a minimal conicity, thus enabling the forming of the recess and/or unforming of the recess during production. The fourth sub-receiving region has a length of 3 mm to 8 mm, preferably of 5 mm to 6.5 mm. Furthermore, the fourth sub-receiving region in particular has a width, preferably measured perpendicularly to the main extension direction, of 3 mm to 6 mm, preferably of 4 mm to 5 mm. Furthermore, the fourth sub-receiving region preferably has a height, in particular measured in the bristle direction, respectively perpendicularly to the main extension direction, of 3 mm to 6 mm, preferably of 4 mm to 5 mm. In particular, the fourth sub-receiving region serves for holding the second fixing region. The fourth sub-receiving region in particular has a slight conicity. The cross section of the fourth sub-receiving region with the slightly conical shape in particular serves to allow an optimal fixing of the interface accommodation unit in the application unit. When the interface accommodation unit is inserted, the contact between the surfaces of the fourth sub-receiving region of the receiving region and the second fixing region in particular takes place rather late, such that the force for insertion, respectively mounting, is increased only at the end of the insertion. Furthermore, the conicity in particular enables uniforming during production. The fourth sub-receiving region furthermore in particular serves for a force transmission. The cross-section shape is in particular selected such that the force transmission from the interface to the application unit via the interface accommodation unit is enabled. The side surfaces of the cross section of the second fixing region form abutments at the fourth sub-receiving region, which in particular permit favorable force transmission.

If the construction of the fixing regions is modified, this may also result in a change of the interface accommodation unit. For example, the spring section may be arranged differently with respect to the fixing regions. The spring section may thus be arranged, from the front end of the interface accommodation unit, in such a way that first the fixing regions or a combined fixing region or only one fixing region are/is arranged and the spring section is situated behind them/it. When the interface is in such a case inserted in the interface accommodation, then the interface is the first to come into contact with the spring section in the interface accommodation unit.

The receiving region of the application unit in particular comprises up to five sub-receiving regions, which are arranged behind one another along the main extension direction. A first sub-receiving region is in particular implemented by a run-in zone. A third sub-receiving region is in particular implemented by a spring zone. A fifth sub-receiving region is in particular implemented by an empty space. The second sub-receiving region and the fourth sub-receiving region form in each case a fixing region. In particular, an opening of the receiving region of the plug-on section is adjacent to the first sub-receiving region. The fifth sub-receiving region in particular forms a closed end of the receiving region of the plug-on section. The third sub-receiving region is arranged precisely between the second sub-receiving region and the fourth sub-receiving region. The transition from the second sub-receiving region to the third sub-receiving region is in particular realized by a diameter leap and/or cross section leap. The transition from the third sub-receiving region to the fourth sub-receiving region is in particular realized by a diameter leap and/or cross section leap on all sides. The transition from the first sub-receiving region to the second sub-receiving region is in particular realized by a non-continuous ledge and/or a non-continuous step. The second sub-receiving region is in particular arranged centrically with respect to the first sub-receiving region. In this way in particular an advantageous connection of the interface accommodation unit and the application unit is achievable. In particular, advantageous fixing of the interface accommodation unit in the receiving region of the plug-on section is achievable. Furthermore an advantageous rotational securing is achievable.

A connection between the interface accommodation unit and the application unit is brought about essentially via the first fixing region of the interface accommodation unit acting together with the second sub-receiving region of the application unit and via the second fixing region of the interface accommodation unit acting together with the fourth sub-receiving region of the application unit. The fixing is in particular brought about by the ring of the first fixing region of the interface accommodation unit latching in the recess in the second sub-receiving region of the application unit, and by the second fixing region of the interface accommodation unit getting clamped in the fourth sub-receiving region of the application unit. The ring is in particular adjacent to the recess of the second sub-receiving region on a side that faces toward the opening of the receiving region. Furthermore, in particular the second fixing region is pressed and centered in the fourth sub-receiving region. The angles of the second fixing region and the fourth sub-receiving region match each other. In particular, planar contact occurs only when the interface accommodation unit has been fully inserted. In this region force transmission takes place between the second fixing region and the fourth sub-receiving region. In a mounted state of the interface accommodation unit, there is a clamping between the ring of the first fixing region and the clamping of the second fixing region. In particular, a holding force of 5 kg to 20 kg, preferably 7.5 kg to 12.5 kg, is generated between the interface accommodation unit and the application unit. A mounting force, i.e. the force required for mounting the interface accommodation unit into the application unit, in particular amounts to 10 kg to 21 kg, preferably to 13 kg to 19 kg. In particular, different possible settings are conceivable for the holding forces of the interface accommodation unit in the application unit. Essential factors are in particular the recess in the second sub-receiving region and the ring of the first fixing region as well as the tolerances between the contacting surfaces.

A first sub-receiving region of the receiving region of the plug-on section is in particular embodied by a run-in zone. The first sub-receiving region is realized by a clearance. In the first sub-receiving region the application unit in particular has no contact with the interface accommodation unit and/or with the toothbrush handpiece. The interface of the toothbrush handpiece is in the first sub-receiving region in particular free-standing without contact to the application unit and/or to the interface accommodation unit. Furthermore, further geometries of the toothbrush handpiece may be situated in the first sub-receiving region, for example if the interface exits from a protruding stub and the stub is to be "hidden" in the plug-on brush device. The total length of the first sub-receiving region is in particular 5 mm to 10 mm, preferably 6 mm to 8 mm. The first sub-receiving region in particular has a first partial region shaped as a straight circular cylinder. The first partial region in particular has a length of 2 mm to 4 mm, preferably of 2.5 mm to 3.5 mm. The diameter of the first partial region of the first sub-receiving region is in particular 7 mm to 13 mm, preferably 9 mm to 11 mm. Preferably, a front end of the first partial region is directly followed by a second partial region, which forms a narrowing toward the center of the recess. The second partial region in particular forms a truncated-cone-shaped recess. The length of the second partial region of the first sub-receiving region is in particular in a range of 3 mm to 5 mm, preferably of 3.5 mm to 4.5 mm. A smallest diameter of the second partial region, in particular on a side facing away from the first partial region, is in particular in a range of 6 mm to 12 mm, preferably of 8 mm to 10 mm. On an inner side of the first sub-receiving region there are in particular pedestals protruding into the recess. The pedestals in particular continue from the first partial region into the second partial region of the first sub-receiving region. The pedestals in particular extend at least substantially parallel to the main extension direction of the interface accommodation unit. The pedestals are in particular arranged such that they are evenly distributed in a circumferential direction. Preferably the pedestals are arranged symmetrically with respect to a plane that extends through a middle axis of the application unit. In particular, respectively two and two pedestals are arranged cross-wise symmetrically, in particular in a centrally symmetrical fashion. The orientation of the pedestals is in particular always such that they correspond for the function with a respective counter element. The function of the pedestals is in particular to support the plug-on brush device. Electrical toothbrushes mostly have a rechargeable battery; there will be a charging station for the product for loading said battery. At the charging station there are support positions for plug-on brush devices, in particular for brush heads, such that for example a manual device can be used by two persons, respectively such that two persons' plug-on brush devices can be stored. The geometry of the support stubs at the support positions, which are configured such that the plug-on brushes can be stuck thereon, are shaped differently than the basic interface geometry of the plug-on brush device. Thus due to the pedestals, on the one hand the plug-on brush devices fit onto the manual toothbrush device and on the other hand the plug-on brush devices can be stuck onto the charging station. In particular, the pedestals are shaped so as to enable the clamping between the plug-on brush device and the charging apparatus. The pedestals in particular have in each case a width of 1 mm to 3 mm, preferably of 1.5 mm to 2.5 mm. Furthermore, the pedestals preferably have a height of 0.1 mm to 1 mm, preferably of 0.1 mm to 0.4 mm. The length of the pedestals in particular corresponds to the height of the support stubs at the charging appliance. In particular, said length preferably corresponds at least to the height of the support stubs, amounting in particular to 2 mm to 10 mm, preferably to 3.5 mm to 6.5 mm.

The fifth sub-receiving region may in particular be realized by an empty space. A transition from the fourth sub-receiving region to the fifth sub-receiving region is in particular realized by a diameter leap and/or cross section leap on all sides. The total length of the fifth sub-receiving region is in particular 0.5 mm to 3 mm, preferably 1.5 mm to 2.5 mm. The cross section is in particular reduced with respect to the preceding cross section of the fourth sub-receiving region. In particular, the fifth sub-receiving region is centered with respect to the mounted interface accommodation unit. In particular, the gate mark of the interface accommodation unit is arranged centrally on the end surface of the second fixing region. Preferably the fifth sub-receiving region serves for receiving the gate mark of the interface accommodation unit. The fifth sub-receiving region in particular forms an empty region in the mounted state. Preferably the fifth sub-receiving region in particular serves as a compression zone for retained air during the mounting of the interface accommodation unit in the receiving region. The fifth sub-receiving region furthermore in particular forms a clearance for the gate mark of the interface accommodation unit. Due to the clearance it is in the mounted state in particular possible that mounting is enabled, both with a flat gate mark and with a protruding gate mark.

Beyond this, the invention is based on a plug-on brush device. It is proposed that the interface accommodation unit comprises at least one spring section which is configured, in a state when an interface of the toothbrush handpiece is accommodated, to exert a tension force onto the interface of the toothbrush handpiece. Preferably the spring section is realized by the spring zone which is arranged between the first fixing region of the interface accommodation unit and the second fixing region of the interface accommodation unit. A "spring section" is in particular to mean, in this context, a section of the interface accommodation unit comprising at least one spring element for creating a clamping connection. By a "spring element" is in particular a spring-elastic element for creating a clamping connection to be understood, which is configured to be elastically deflected during mounting. Preferably it is in particular to mean a macroscopic element which has at least one extent that is in a normal operation state elastically modifiable and/or displaceable by at least 10%, in particular by at least 20% and preferably by at least 30%, and which in particular generates a counterforce counteracting the modification, which depends on a modification of the extent and is preferably proportional to the modification. An "extent" of an element is in particular to mean a maximal distance between two points of a perpendicular projection of the element onto a plane. By a "macroscopic element" is in particular an element to be understood that has an extent of at least 0.5 mm, in particular of at least 1 mm and preferably of at least 2 mm. The spring section in particular extends between the first fixing region and the second fixing region. The spring section preferably has a total length of 8 mm to 13 mm, preferably of 9.5 mm to 11.5 mm. The spring section in particular has an at least approximately circular-cylindrical basic shape. The spring section in particular has a cylindrical basic shape with a circle-segment-shaped cross section. The cylindrical basic shape in particular forms part of the base body of the interface accommodation unit. The basic shape of the spring section preferably has a ledge. On its outer side, the spring section only has discrete contact points and/or contact surfaces with the application unit. In particular, the spring section principally has clearance. On its inner side, the spring section comprises a receiving region for receiving a partial region, in particular the free end, of the interface of the toothbrush handpiece. The receiving region of the spring section in particular constitutes a relevant interaction zone with the interface of the toothbrush handpiece. The spring section in particular serves to ensure an unambiguous orientation of the interface, in particular the axle, with respect to the plug-on brush device. In an accommodated state, the interface in particular adjoins the inner side of the spring section on a front side. The basic shape of the spring section in particular forms a half-tube-shaped tub for receiving the interface. In particular, a tub is formed, with the termination of the tub forming a clearance. In a front region of the spring section, on a side facing toward the second fixing region, the basic shape of the spring section in particular has a blind hole. In a middle and a rear region of the spring section, the spring section in particular comprises at least one spring element that is arranged opposite the interface and opposite the basic shape. The basic shape of the spring section is in particular shell-shaped at the top. This in particular reliably allows attaining a transmission of the movement of the interface. It is furthermore in particular possible to reliably achieve a rotationally fixed fixing of the interface of the toothbrush handpiece.

The interface accommodation unit may comprise two, three, four or more spring sections, which are configured, in a state when an interface of the toothbrush handpiece is accommodated, to exert a tension force onto the interface of the toothbrush handpiece.

Preferably the third sub-receiving region of the receiving region of the plug-on section, which is realized as a spring zone, is implemented correspondingly to the spring section.

The third sub-receiving region is in particular arranged eccentrically with respect to the second sub-receiving region. A geometry of the receiving region, on a side of the receiving region that faces toward the front side and the rear side of the application unit, continues between the second sub-receiving region and the third sub-receiving region. On a righthand side and a lefthand side of the receiving region which face away from the application unit, there is a diameter leap between the second sub-receiving region and the third sub-receiving region. The side of the receiving region that faces toward the rear side of the application unit in particular forms a support zone for a spring element of the spring section of the interface accommodation unit. The third sub-receiving region in particular has a total length of 8 mm to 13 mm, preferably of 10 mm to 11.5 mm. The total length in particular interacts with the at least one spring element of the spring section of the interface accommodation unit. The interface accommodation unit preferably needs to have the same length in the corresponding region as the third sub-receiving region of the application unit. The length of the interface accommodation unit is in particular selected such that the at least one spring element of the spring section works in the required manner. The third sub-receiving region in particular has a circle-shaped cross-section shape with a protuberance. The protuberance is arranged on the rear side of the receiving region. The protuberance in particular corresponds with the rear side of the interface accommodation unit. A highest point of the receiving region, in particular a point of the receiving region that faces toward the front side, continues from the second sub-receiving region into the third sub-receiving region. This in particular serves for an insertion of the interface accommodation unit during mounting, wherein during insertion the front side of the interface accommodation unit is in particular situated on a continuous surface.

It is also proposed that the spring section of the interface accommodation unit comprises at least one spring bar element and at least one bow spring element, each of which is configured, in an accommodated state of an interface of the toothbrush handpiece, to exert a tension force onto the interface of the toothbrush handpiece. Preferably the spring bar element and the bow spring element are in each case configured to exert a tension force onto a common point. Preferentially the spring bar element and the bow spring element are in each case configured to exert a tension force onto the interface of the toothbrush handpiece in a common region. A "spring bar element" is in particular to be understood, in this context, as a bar-shaped spring element. Preferably the spring bar element has a rectangular basic shape in a relaxed state. Preferentially a longitudinal extent of the spring bar element is substantially greater than a transversal extent of the spring bar element, in particular at least twice as great, preferably at least three times as great and especially preferentially at least five times as great. Particularly preferentially the spring bar element has at least one free end. By a "bow spring element" is in particular, in this context, an arc-shaped spring element to be understood. The bow spring element preferably has a circular-arc-shaped basic shape. The spring bar element and the bow spring element are preferably arranged on a rear side of the interface accommodation unit. In particular, the spring bar element and the bow spring element are adapted to a shape of the interface of the toothbrush handpiece, such that in particular different arrangements and implementations are possible. The spring bar element and the bow spring element in particular act together. This in particular allows reliably achieving a transmission of the movement of the interface. Furthermore, in this way it is in particular possible to reliably achieve a rotationally fixed fixing of the interface of the toothbrush handpiece.

Furthermore, it is proposed that the at least one spring bar element and the at least one bow spring element are implemented integrally. "Integrally" is in particular, in this context, to mean connected by substance-to-substance bond, like for example via a welding process and/or a gluing process etc., and especially advantageously molded-on, like by a production from a cast and/or by a production in a one-component or multi-component injection-molding procedure. Preferably the at least one spring bar element and the at least one bow spring element are at least partially connected behind each other in series. The at least one spring bar element and the at least one bow spring element exert a spring force, in particular at least substantially perpendicularly to the main extension direction of the interface accommodation unit. In an operation state, the at least one spring bar element and the at least one bow spring element are in particular tensioned between the application unit and the interface. The at least one spring bar element and the at least one bow spring element preferably have two abutment surfaces. The at least one bow spring element is in particular supported by a pedestal on an outside of its arc at the inner side of the receiving region of the plug-on section. The at least one spring bar element is in particular supported by a pedestal on the inner side of the receiving region of the plug-on section. The at least one spring bar element is in particular supported interiorly by a pedestal on a spring tongue of the spring bar element at the interface of the toothbrush handpiece. The at least one spring bar element and the at least one bow spring element together in particular form a clamping part of the spring section. The spring section preferably comprises a clamping part but it would also be possible that the spring section comprises, for example, two, three, four or several clamping parts. The clamping part is in particular situated in the rear region of the spring section. The spring section preferably comprises one clamping part but it would also be possible that the spring section comprises, for example, two, three, four or several clamping parts. The clamping part is in particular located in the rear region of the spring section. The bow spring element is in particular configured to be supported on an inner side of the application unit.

The bow spring element is in particular implemented by an arc-shaped and/or bridge-like spring element. The bow spring element in particular serves for a connection between the spring bar element and the base body of the interface accommodation unit. Preferably the bow spring element is connected to the spring bar element with a first end and is connected to the base body of the interface accommodation unit with a second end. The bow spring element in particular has a pedestal on an outer side of the arc. The pedestal in particular has a length of 1 mm to 4.5 mm, preferably of 2.5 mm to 3.5 mm. Furthermore, the pedestal in particular has a width of 1 mm to 3.5 mm, preferably of 1.5 mm to 2.5 mm. The pedestal of the bow spring element in particular serves for a secure support of the bow spring element in the receiving region of the plug-on section of the application unit. Moreover, the pedestal in particular forms a support point of the spring system. In particular, by means of the pedestal of the bow spring element, respectively in particular by a height of the pedestal of the bow spring element, a force can be adjusted which eventually acts onto the interface of the toothbrush handpiece. For example, a higher force can be generated by means of an increased height of the pedestal, as the bow spring element is in the mounted state pressed toward the interface accommodation unit. The spring bar element has clearance in particular sidewise and at the rear. Preferably the spring bar element is embodied such that it is substantially free-standing. In a relaxed state, the spring bar element extends parallel to the main extension direction, in particular at a little distance from the interface accommodation unit. A width of the sidewise clearance, in particular measured on one side, is in particular 0.1 mm to 1 mm, preferably 0.25 mm to 0.75 mm. A length of a total clearance along the main extension direction is in particular 5 mm to 11 mm, preferably 8 mm to 9.5 mm. A length of the clearance in particular corresponds to a length of the clamping element with the spring bar element and the bow spring element. The clamping element with the spring bar element and the bow spring element is configured to exert a clamping force onto the interface of the toothbrush handpiece. The clamping force defines the pull-off force of the plug-on brush device from the interface of the toothbrush handpiece. The clamping force is in particular smaller than the force required for removing the interface accommodation unit out of the application unit. Preferably the clamping force is defined via a pull-off force, thus in particular the force required to remove the mounted plug-on brush device from the interface of the toothbrush handpiece. The pull-off force is in particular an interaction between the interface of the toothbrush handpiece and the plug-on brush device. In the plug-on brush device there are in particular several adjustment possibilities for a holding force, in particular by an adaption of the interface accommodation unit to the interface. For example, a tolerance between the contacting surfaces, a pre-load of the spring elements, a height of the pedestal on the bow spring element, a height of the pedestal on the spring bar element can be adjusted. Preferably the cross section of the interface accommodation unit and a cross section of the interface of the toothbrush handpiece are adapted to each other, in particular with cross sections of directly adjoining regions and cross sections of regions having clearance. In a state when the toothbrush handpiece is connected with the plug-on brush device, the interface of the toothbrush handpiece is in particular in line with a bristle surface of the plug-on brush device. In particular, a pedestal of the spring bar element presses onto a fluted surface of the interface for a force transmission and for a fixing of the interface. A pull-off weight of the plug-on brush device from the interface in particular amounts to 0.75 kg to 3.5 kg, preferably to 1.2 kg to 2.8 kg. In this way in particular reliable fixing of the interface is attainable. In particular, a long service life of the interface accommodation unit is attainable. It is furthermore in particular possible to reliably achieve a transmission of the movement of the interface. Furthermore, it is in particular possible to reliably achieve a transmission of the movement of the interface. Furthermore, in this way in particular a rotationally fixed fixing of the interface of the toothbrush handpiece is reliably achievable.

It is further proposed that the at least one spring bar element and the at least one bow spring element are, in each case with one end, connected to a base body of the interface accommodation unit, wherein the ends face away from each other. Preferably the at least one spring bar element is connected to a base body of the interface accommodation unit with a front end and is connected to the bow spring element with a rear end, the ends facing away from each other. Preferentially the at least one bow spring element is connected to the interface accommodation unit with a rear end and is connected to the spring bar element with a front end, the ends facing away from each other.

A mirrored arrangement is also possible; namely that the at least one spring bar element is connected to a base body of the interface accommodation unit with a rear end and is connected to the bow spring element with a front end, the ends facing away from each other. The at least one bow spring element is then connected to a base body of the interface accommodation unit with a front end and is connected to the spring bar element with a rear end, the ends facing away from each other.

As a result, the spring bar element is in particular additionally connected to the base body of the interface accommodation unit via the bow spring element and vice versa.

The connection of the spring bar element and the bow spring element to the interface accommodation unit is in each case brought about at an end of the respective element. Regarding the inserted interface, respectively the longitudinal axis of the inserted interface, the connection of the spring bar element to the interface accommodation unit is situated lower than the connection of the bow spring element to the interface accommodation unit. The height difference is between 0.5 mm and 3 mm, preferably between 0.9 mm and 2 mm. The connections spring bar element-interface accommodation unit and bow spring element-interface accommodation unit are preferably located on a longitudinal axis and are not displaced sideways.

It would also be conceivable that the spring bar element has on a front end, in which the spring bar element is connected to the base body of the interface accommodation unit, a material weakening, in particular like a film hinge. In this way in particular a holding force is reducible and/or a greater force can be generated by the support via the bow spring element. The spring bar element and the bow spring element together in particular form a web that runs along the main extension direction of the interface accommodation unit and extends at least approximately across the entire spring section. This in particular allows achieving a reliable fixing of the interface. In particular, a long service life of the interface accommodation unit is achievable. Furthermore, it is in particular possible to reliably achieve a transmission of the movement of the interface. Moreover, this in particular reliably allows attaining a rotationally fixed fixing of the interface of the toothbrush handpiece.

It is also proposed that the at least one bow spring element is configured to be supported on an inner surface of the receiving region of the plug-on section. The bow spring element is in particular configured to be supported on an inner side of the application unit. Preferably the at least one bow spring element is in particular configured to at least partially generate a tension force between the inner surface of the receiving region of the plug-on section and the interface of the toothbrush handpiece. The bow spring element is supported at the inner surface of the receiving region of the plug-on section, in particular on a middle region that is distanced from the ends. In this way it is in particular advantageously possible to build up tension. It is in particular advantageously possible to generate a high clamping force. This in particular advantageously allows achieving a non-continuous progression of the clamping force during a connection of the interface with the plug-on brush device.

Beyond this it is proposed that the at least one bow spring element comprises at least one pedestal, which is configured for adjoining the inner surface of the receiving region of the plug-on section. The pedestal is in particular arranged on an outer side of the arc of the bow spring element. The pedestal is preferably realized by a rectangular pedestal. In particular, the pedestal forms an elevation with respect to a basic shape of the bow spring element. Particularly preferentially the pedestal in particular implements a point of the bow spring element that has the greatest distance from a middle axis of the interface accommodation unit. The pedestal in particular has a length of 1 mm to 4.5 mm, preferably of 2.5 mm to 3.5 mm. Furthermore, the pedestal in particular has a width of 1 mm to 3.5 mm, preferably of 1.5 mm to 2.5 mm. The pedestal of the bow spring element in particular serves for a secure support of the bow spring element in the receiving region of the plug-on section of the application unit. In particular, the pedestal further implements a support point of the clamping element with the spring bar element and the bow spring element. In particular, by means of the pedestal of the bow spring element, in particular by the height of the pedestal of the bow spring element, a force can be adjusted which eventually acts onto the interface of the toothbrush handpiece. For example, by a greater height of the pedestal a greater force can be generated as the bow spring element is in the mounted state pressed toward the interface accommodation unit. This in particular advantageously allows building up tension. It is in particular advantageously possible to generate a high clamping force. In particular, in this way a non-continuous progression of the clamping force is achievable during a connection of the interface with the plug-on brush device.

Furthermore, it is proposed that the at least one spring bar element has a free end which forms a spring tongue. Preferably the spring bar element has a free rear end. An end of the spring bar element that faces toward a lower end is in particular implemented free from a connection with the base body of the interface accommodation unit. The spring bar element preferably forms a lance in a longitudinal direction. The spring bar element in particular forms a free-standing spring tongue behind a connection with the bow spring element. The spring tongue is formed such that the interface of the toothbrush handpiece is inserted into the recess correctly, without getting hooked in the spring geometry. In particular, in this way a centering of the interface of the toothbrush handpiece during insertion in the interface accommodation can be supported, and it is furthermore possible to avoid the interface, the metal axle of the toothbrush handpiece respectively getting hooked in free-standing structures of the spring bar element and/or of the bow spring element. This in particular enables advantageous coupling of the interface of the toothbrush handpiece with the plug-on brush device. In particular, advantageous centering of the interface of the toothbrush handpiece in the interface accommodation unit is achievable.

It is moreover proposed that the at least one spring bar element comprises at least one pedestal, which is configured to introduce a clamping force of the spring section onto the interface, for example a metal axle or synthetic axle of the toothbrush handpiece. The at least one spring bar element is in particular supported inside on the interface of the toothbrush handpiece. The pedestal is preferably realized by a rectangular pedestal. In particular, the pedestal forms an elevation with respect to a basic shape of the spring bar element. Particularly preferentially the pedestal in particular implements a point of the spring bar element that is situated closest to the middle axis of the interface accommodation unit. The pedestal in particular has a length of 1.5 mm to 4.5 mm, preferably of 2.5 mm to 3.5 mm. Furthermore, the pedestal in particular has a width of 1 mm to 3.5 mm, preferably of 1.5 mm to 2.5 mm. The pedestal is in particular arranged directly following a connection point of the bow spring element with the spring bar element. The pedestal is in particular arranged on a side of the spring bar element that faces away from the bow spring element. The position and/or the shape of the pedestal are/is in particular adapted to the interface of the toothbrush handpiece. In particular, the pedestal must fit onto the corresponding flat and/or fluted surface of the interface. The pedestal in particular serves as a contact point to the interface of the toothbrush handpiece. In particular, via the pedestal a clamping force is introduced onto the interface. In particular, a great amount of force is projected onto a small area via the pedestal. In particular, sticking friction is reduced with respect to a complete support. This in its turn correspondingly allows advantageously inserting and also advantageously removing the interface of the toothbrush handpiece. At the same time in particular advantageous fixing is attainable.

The described sub-receiving regions of the accommodation may be arranged as described. However, it is also possible to choose the arrangement in a different manner or to omit certain sub-receiving regions.

It is for example possible to omit the fifth sub-receiving region, for example if the gate mark of the interface accommodation unit is arranged differently. A different arrangement may, for example, mean a different position or a different geometric implementation of the position (like a gate mark in a deepening, such that the gate mark cannot abut on other geometries).

For example, a first sub-receiving region may be omitted if, for example, no plug-on opportunity by means of pedestals is required for a support on the charging station or if no further portions of the toothbrush handpiece need to be accommodated therein. The interface would then be inserted directly into the second sub-receiving region and the first sub-receiving region would be omitted and would therefore not be traversed either.

The arrangement of the second and fourth sub-receiving regions and of the third sub-receiving region is directly related to an implementation of the interface accommodation unit. The respective regions must correspond to one another. Of course a different arrangement of the fixing regions—as described above—leads to a modified arrangement of the second and fourth sub-receiving regions. In the same way omissions are possible, for example if the fixing regions of the interface accommodation are combined, only one appropriately formed counterpiece is required at the application unit.

It is further proposed that the brush head comprises a defined bristle field. It is in particular conceivable that the brush head comprises a bristle field with at least two substantially differing bristle bundles. Preferably the brush head comprises a plurality of substantially differing bristle bundles. By "substantially differing bristle bundles" is in particular to be understood, in this context, that the at least two bristle bundles substantially differ at least with regard to their shape and/or their orientation. Preferably the bristle bundles have substantially differing shapes and/or substantially differing orientations. By "substantially differing shapes" of the bristle bundles is in particular to be understood, in this context, that a base area of a first bristle bundle, in particular having any orientation, differs from a base area of a second bristle bundle by at least 10%, preferably by at least 30% and particularly preferentially by at least 50%. Preferably, in a superposition maximally 80%, preferably maximally 60% and particularly preferentially maximally 40% of an area content of the base area of the first bristle bundle and/or of the second bristle bundle form an intersection. By "substantially differing orientations" is in particular to be understood, in this context, that an orientation of the bristles of a first bristle bundle differs from an orientation of the bristles of a second bristle bundle by at least 10°, preferably by at least 20° and particularly preferentially by at least 30°. This in particular enables achieving an advantageous cleaning performance.

The bristle bundles may be anchored in the brush head, respectively in the perforated field, by means of an anchorless hot-tufting method. However, different production methods for producing the bristle bundles, deemed expedient by someone skilled in the art, are conceivable. Specifically for the method, the bristle holes in the brush head have, viewed in a plan view, principally closed contours, wherein any possible geometrical shapes may be applied. The bristle bundles, respectively their base areas, may be implemented so as to be circle-shaped, circular-annulus-shaped, circle-segment-shaped, star-shaped, triangular, polygon-shaped, rectangular or square, etc. Furthermore, different bristles may be inserted in different bristle bundles within a bristle field or even within a bristle bundle. Preferably the bristle bundles are also implemented mirror-symmetrically to a longitudinal axis and/or to a transversal axis of the brush head and/or centrally symmetrically, preferably with respect to a geometric center of the brush head. Within a bristle field, a topography, i.e. in particular the surface of usage-side bristle ends or cleaning elements, is preferably implemented in a flat, spine-shaped, tub-shaped, cup-shaped, pinnacle-shaped, cone-shaped and/or row-wise manner and/or in the form of elevated and/or embedded logos or letters. In the method, firstly the base body of the plug-on brush is injection-molded with blind holes, respectively recesses, in the head region. Then bristles are provided in bundles and are melted bundle-wise. After this the base body is heated in the head region, approximately to a glass transition temperature. Eventually the melted bristle ends are inserted into the blind holes, respectively recesses, and the bristle bundles are anchored in the brush head under pressure. Herein the size of the blind holes is reduced, and/or the geometry is deformed, and thus the bristle bundles are anchored.

Advantageously, at least some or all of the bristles are customarily extruded bristles. Bristles may herein in particular comprise at least one hard component and/or at least one soft component. Preferably the bristles are made at least partially or completely of polyamide (PA) and/or of polyester (PBT), wherein any other materials are conceivable. It is further conceivable that at least some of the bristles have a tapering and/or have a changing cross section. Preferably the bristles are made of a single material, in particular a mixed material. However, bristles having several components are also conceivable, which may in particular be producible and/or produced via at least one co-extrusion. For example, the bristles may be producible and/or produced via extrusion, trimming and/or post-processing. The bristles may herein be extruded from one material but may also be extruded from several materials, in particular via co-extrusion.

In particular, bristles with a circular cross section are conceivable, wherein any other cross sections are also conceivable, like for example polygonal, triangular, rectangular, square, elliptic, star-shaped, trapezoid-shaped, parallelogram-shaped, lozenge-shaped or any other cross sections. In particular, different bristles may be used in one bristle bundle, but different bristle bundles—in particular respectively having a certain kind of bristles—may be used as well. Bristles and/or bristle bundles may herein be arranged regularly but may also be arranged irregularly. In particular, bristles and/or bristle bundles which are arranged in groups and/or neighboring bristles and/or bristle bundles may differ, in particular alternatingly, by at least one characteristic, like for example a length, a diameter, a material, a color, a material hardness, a geometry, a tapering, or the like.

Preferably the bristles for oral hygiene applications have a diameter, in particular perpendicularly to their longitudinal axis, of at least 0.075 mm and/or of maximally 0.25 mm. Advantageously the bristles have a cross section area, in particular perpendicularly to their longitudinal axis, of at least 0.002 mm$^2$ and/or of maximally 0.2 mm$^2$. In the case of bristles utilized in the field of cosmetics, for example bristles of an additional application element, thinner bristles and/or bristles having a smaller diameter may be used. In the case of tapered bristles, in particular polyester (PBT) is suitable as a material, wherein a tapering may be brought about mechanically and/or chemically. However, other materials are also conceivable. Preferably, the bristles are straight in a longitudinal direction, but wave-shaped and/or twisted and/or helix-shaped and/or twirled bristles are also conceivable, in particular combinations of different bristles. Furthermore, bristles with a smooth surface as well as bristles with a textured surface are conceivable.

Beyond this the bristles are anchored in the brush head, in particular fastened to the bristle carrier, in particular as bristle bundles, preferably at least by anchor punching, by anchor-free tufting (AFT), by in-mold tufting (IMT) or the like. Preferably the bristle carrier comprises a plurality of bristle receptacles, in particular holes for bristle bundles, which are in particular drilled and/or molded by injection molding. In the case of anchor punching, it is for example conceivable that first a base body, preferably a base body of the application element and/or of the brush head, is produced via injection molding, in particular of a hard component, wherein advantageously blind holes for bristle bundles are formed in the injection molding. Of course, however, subsequent drilling of blind holes is also conceivable. Preferably then bristles, respectively bristle bundles, are folded and are in each case fastened in a respective blind hole by at least one anchor, in particular via punching-in.

As has been described, anchor-free methods are alternatively also conceivable, wherein advantageously bristles, respectively bristle bundles, are not folded. In such a case bristles, respectively bristle bundles, have about half a length as compared to anchor punching. It is for example conceivable that bristle bundles are first singulated, then bristle bundles are melted with each other and/or bristle ends are—in particular subsequently—overmolded for a fastening of the bristle bundles. Herein bristle bundles may advantageously be merged. Herein a production via in-mold tufting (IMT) is possible, wherein advantageously a base body, for example a base body of the brush head and/or of the handle unit and/or of the fastening unit, is formed in the overmolding of the bristle ends. In the same way it is conceivable that, in particular in the course of an integrated anchorless production, bristles are first overmolded with one or several platelets or the like, and these platelets are then overmolded in their turn, for example in order to form the brush head and/or the handle unit.

It is furthermore conceivable that firstly bristle platelets with through holes are made via injection molding, and then bristles are guided through said through holes. Preferably, after that the bristles are connected, in particular melted, in particular with one another and/or with the corresponding bristle platelet, on a rear side. Bristle platelets furnished with bristles in this manner may then be welded and/or glued, preferably via ultrasound welding, with a base body, in particular a brush head. In this context, Boucherie AFT (anchor-free tufting) may be named as a well-known production method, which in particular allows a merging of bristle bundles.

As a further method for an anchor-free furnishing with bristles a manufacturing, in particular an injection molding, of a brush head with through holes for bristles is possible.

Bristles may be guided through the through holes afterwards and may be melted on a rear side, in particular with one another and/or with the brush head. Preferably then overmolding of the melted regions and/or of the brush head is carried out, in particular with at least one soft component. Herein, for example, a Boucherie AMR method is applied, which in particular does not allow a merging of bristle bundles, or an AMR+ method is applied, which in particular allows a merging of bristle bundles.

It is moreover conceivable to produce first a brush head with blind holes, for example by injection molding and/or by drilling the blind holes. Bristles are in this case in particular laid together to form bundles and are melted and/or otherwise connected in one end. The brush head is then heated, in particular to a glass transition temperature of its material. After this it is advantageously possible to introduce bristle bundles into the blind holes and to anchor them at the brush head by pressing-on. Herein, in particular, the heated blind holes are deformed, such that the bristle bundles are anchored therein.

Alternatively or additionally to punched and/or glued-on and/or welded-on bristles, molded-on bristles and/or twisted-in bristles, like in particular for interdental brushes, are also conceivable. The molded-on bristles may in particular be produced during a multi-component injection-molding procedure together with the application unit, the handle unit and/or the fastening unit, or they may be subsequently injection-molded onto a base body of the application unit. A hard component, a soft component or a specific material for injection-molded bristles may be applied for the molded-on bristles.

A further possible method for a furnishing of the brush head with bristles is twisting-in, by which a cylindrical brush is realized. Herein, for example, bristles are fed from a roll, wherein in particular several bristle strands are wound on a roll. For loading a machine, in each case a plurality of rolls are pre-tensioned, each bristle of the brush corresponding to one bristle strand. The bristles are correctly spread regarding a width, such that they have the width which they are inserted in the brush with. The bristles are pulled forward in such a way that they are then free-standing for the next step, i.e. such that a wire can be guided over them. After this a wire is fed onto the machine from a roll, which means the wire is wound off and is introduced into the process. The wire is cut to a length that is greater than the wound-off length of the twisted-in brush; the final cutting to length is done after twisting in. The wire is bent to form a U, such that the open side can then be slid over the bristles for threading the bristles in. The wire is held at the bottom of the U. Then the open wire end is clamped in order to make the bristles be held between the wire pieces. The bristles are cut to a length that is greater than the final length in the brush, such that the brush can be cut correctly when the bristles have been twisted in. The wire is twisted, such that the bristles are clamped between the wire and are thus fixed. When the bristles have been fixed in the wire, they are cut to the correct length and profiled. When the brush portion has been finished, the surplus wire is cut off.

Preferably, in an injection-molding process, in particular a two-component and/or multi-component injection-molding, materials of injection-molded bristles do not enter a material connection with other soft components and/or hard components of the oral hygiene device. On the contrary, injection-molded bristles are preferentially connected to soft components and/or hard components via a form-fit connection, for example via at least one undercut and/or at least one breakthrough and/or via at least one at least partial overmolding, wherein in particular a dwindle connection and/or a shrinkage connection are/is conceivable. However, a connection via at least one material connection is also conceivable.

For all the possible injection-molding processes mentioned, principally a one-component, two-component and/or multi-component injection molding is conceivable. As has been mentioned, materials used, in particular different soft components and/or hard components, may herein be connected by substance-to-substance bond and/or in a form-fit connection. It is also conceivable that articulated connections are formed via suitable injection-molding steps. Principally, for example, hot-runner methods, cold-runner methods and/or co-injection methods are possible.

Alternatively or additionally to a cleaning element that is embodied as a brush head, the plug-on brush may also comprise at least one tongue cleaner and/or at least one cleaning and/or massaging element. These may respectively be implemented of a soft component, of a hard component or of a combination of soft and hard component, and/or they may advantageously be producible and/or produced via injection molding. Furthermore, different implementations are conceivable for the bristles of the brush head.

The bristles may preferably be implemented by injection-molded bristles which are, other than customary extruded bristles, produced via injection molding. A variety of materials for injection-molded bristles, deemed expedient by someone skilled in the art, are conceivable. Preferably injection-molded bristles are made at least partially, advantageously completely, of a thermoplastic polyurethane elastomer (TPE-U). Herein a utilization of a modified polyurethane elastomer (TPE-U) is conceivable which may be modified in particular regarding improved flow characteristics and/or quick solidification, in particular quick crystallization, advantageously already at rather high temperatures. Other materials are of course also conceivable, for example thermoplastic polyester elastomers (TPE-E), thermoplastic polyamide elastomers (TPE-A) or the like. Materials for injection-molded bristles advantageously have a Shore D hardness of at least 0 and especially advantageously of at least 30, and/or of maximally 100, advantageously of maximally 80. In particular, a Shore hardness of a material of injection-molded bristles is advantageously higher than a Shore hardness of the remaining soft components used, for example, for handle elements, massaging elements, further cleaning elements or the like. During the injection-molding process, in particular the two-component or multi-component injection-molding process, materials for injection-molded bristles usually do not enter a material connection with the other soft and/or hard materials used. For possible connections with other hard, respectively soft materials, respectively soft components is therefore a form-fit connection provided, like for example by an undercut and/or in the form of breakthroughs and/or in the form of partial and/or complete overmolding. During a cooling process, the second injection-molded material for injection-molded bristles shrinks onto the first injection-molded material or soft material, respectively soft component, and then in particular forms a shrinkage connection.

In the same way, for the hard component, for the soft component and/or for the material for injection-molded bristles biosynthetic materials can be utilized which may in particular be obtained from sustainable raw materials, which may be biodegradable, in particular compostable, and/or may consist of a recycled and/or recyclable material. Preferably the material is in particular implemented of a synthetic material. Preferably the biodegradable, in particular compostable, and/or recycled and/or recyclable material is implemented of a biosynthetic material, in particular of a synthetic material based on sustainable raw materials and/or of a biodegradable synthetic material. The material may thus in particular be fossil-based and biodegradable, like for example PVOH, PCL, PBAT, PET or PBS, based on sustainable raw materials and biodegradable, like for example PLA, PHA, cellophane or amylum blends, or based on sustainable raw materials but non-biodegradable, like for example Ca, bio PE, bio PP, bio PA, bio PET. Different biosynthetic materials, deemed expedient by someone skilled in the art, are conceivable, like for example amylum-based biosynthetics, cellulose-based biosynthetics, polyhydroxy alkanoates, like in particular polyhydroxybutyric acid (PHB), polyhydroxy lactic acid (PLA), aliphatic and/or aromatic co-polyesters, or further biosynthetic materials, like for example lignin-based biosynthetics. Preferentially the application unit, respectively the handle unit, may be made to a large extent of a biodegradable, in particular compostable, and/or of a recycled material. Preferably the oral hygiene device is made of only one component. In particular, the oral hygiene device comprises a hard component. The material volume body of the application unit, respectively the handle unit, may be made at least to a large extent of the hard component. The hard component and/or the soft component and/or the material for injection-molded bristles in particular consists of a biosynthetic material, which may in particular have been obtained from sustainable raw materials. Herein in particular corn, hemp, sugar, castor oil, palm oil, potatoes, wheat, sugar cane, caoutchouc, wood, the castor plant, and the like are possible as raw materials. Corresponding possible basic materials could, for example, be cellulose, amylum, lactic acid (PLA), glucose, chitin, chitosan, or the like, from which in particular corresponding biosynthetic materials may be synthetized.

There is also the possibility of color-marking the plug-on brush device by a colored interface accommodation unit. In particular, the interface accommodation unit may herein be elongated in such a way that the interface accommodation unit is still visible from the outside. In particular, the interface accommodation unit could extend as far as a shell surface. Preferably the interface accommodation unit could have different colors, while the application unit remains unchanged. In this way in particular distinction in a bathroom at home could be achieved. Alternatively a color-marking may also be implemented by an additional element, like for example a ring. This would in particular be achievable by an implementation of the application unit in the multi-component injection molding via, for example, two components, wherein a colored element, e.g. a colored ring, may be injection-molded on the application unit in a lower region. Alternatively the application unit could be provided with a separate element, for example an elastic ring similar to a sealing ring, wherein the application unit in particular has a recess and/or a receptacle and/or a groove in the lower region, which the element, respectively the ring, is fitted into. The element, respectively the ring, may for example be made at least partially of a soft component, in particular an elastomer, or of a hard component. The element, respectively the ring, is mounted after the injection-molding process.

The interface accommodation unit and/or the additional element, for example the ring, may be made at least partially of a material that has a higher specific weight than the base body of the application unit. For this purpose, metals, respectively metal alloys, may be used. It is however also possible to use, respectively process, metals or inorganic materials having a rather high specific weight (like for example baryte) as additives in a synthetic carrier. The material should achieve a specific weight of more than 2 $g/cm^3$, preferably more than 3 $g/cm^3$. This allows increasing a quality as well as the cleaning performance of the application unit.

Alternatively or additionally, besides the application for an electric toothbrush, the plug-on brush device may also be used for a manual toothbrush. The plug-on brush device may in particular also be used for a manual exchangeable-head toothbrush. The interface may herein in particular have an axle, which is for example made of metal, in analogy to an electrical toothbrush, or the interface may comprise an adapted synthetic peg.

Furthermore, the application unit may be realized by an implementation of the application unit in the multi-component injection molding, for example of two components. For example, soft elements may be applied in the bristle field (e.g. as cleaning elements, massaging elements, etc.). Alternatively, on the surface of the application unit soft portions may be applied which serve for a protection from injuries during application, for aiding with assembly and/or disassembly of the plug-on brush device, and/or which serve as tongue cleaners. Soft portions on the surface of the application unit, which are to prevent injuries, are mainly mounted at least partially on the circumferential edge or on the rear side of the brush head. Moreover, in the region of the support of the inner portion, by means of a soft component, an adjustability of the spring function can be realized and/or vibrations can be damped, like in particular in the region of the interface. Furthermore, the interface accommodation unit may be realized by an implementation of the interface accommodation unit in the multi-component injection molding, for example utilizing two components. For example, overmoldings for improving the functionality, overmoldings of the clamping element, for example in order to improve and/or adjust a reset force, and/or fillings of recesses can be provided, which improve and/or adjust the reset force of the clamping element.

The invention is moreover based on a plug-on brush system with a plug-on brush device according to one of the preceding claims and with a further interface accommodation unit which differs from and is implemented separately from the interface accommodation unit, and which is configured to receive at least one further interface of a toothbrush handpiece which differs from the interface. Preferably the interface and the further interface have differing shapes and/or dimensionings, wherein the interface accommodation units are in each case suitable for a loss-proof accommodation of one of the interfaces. Due to the implementation of the system according to the invention, the application unit of the plug-on brush device ma in particular be utilized for different toothbrush handpieces. In particular, universal utilization of the plug-on brush is achievable.

The further interface accommodation unit may in particular be configured for a further interface, which is embodied as an axle. The difference in length of customary axles, respectively interfaces, is in particular approximately 6 mm. In the case of elongate interfaces, the clamping element of the further interface accommodation unit could in particular be arranged in the front region of the further interface accommodation unit. In particular, a free-floating clamping element could be realized which is supported and/or pre-tensioned at the application unit. Furthermore, in particular a snapper could be provided on the rear side, which latches in a recess of the further interface. Alternatively it would be conceivable that the further interface accommodation unit is merely configured for a frontal planar pressing. Beyond this, it is here in particular also possible that a snapper is provided on the rear side, latching in a recess of the further interface.

Beyond this the invention is based on an electrical toothbrush with an electrical toothbrush handpiece and with the plug-on brush device. An interface of the toothbrush handpiece in particular has surface properties and a surface structure which are adapted to the plug-on brush device. In particular, the interface has a clamping surface and a support surface. The clamping surface in particular has a length of 2 mm to 5 mm, preferably of 3 mm to 4 mm. The clamping surface furthermore in particular has a width of 1.5 mm to 3.5 mm, preferably of 2 mm to 3 mm. Moreover, outside a housing of the toothbrush handpiece, the interface in particular has a free length of 15 mm to 35 mm, preferably of 20 mm to 30 mm. Herein the plug-on brush device must in particular be capable of implementing the power of the toothbrush handpiece transferred via the interface. In particular, the interface accommodation unit must be capable of receiving the power of the interface and of transferring said power to the application units. In the case of an overload, in particular in the case of a failure of the torque, in particular the connection between the interface and the interface accommodation unit and/or the connection between the interface accommodation unit and the application unit must break down before the motor of the toothbrush handpiece is damaged.

The toothbrush unit, respectively the drive unit accommodated therein, has the performance data listed below. The drive has a speed of 200 Hz to 400 Hz, preferably of 260 Hz to 350 Hz. The speed corresponds to 24,000 to 48,000 back-and-forth movements, preferably 30,000 to 42,000 back-and-forth movements (sidewise deflections). The deflection of the interface (e.g. the metal axle) is between 3° and 14°, measured from maximal deflection to maximal deflection. The toothbrush handpiece in particular has a torque of 15 mNm to 35 mNm, preferably of 20 mNm to 30 mNm.

In particular, in this context, the terms "axial" and "radial" refer to a main extension axis of the plug-on brush and/or of the electrical toothbrush handpiece, such that the term "axial" in particular designates a direction running parallel to or coaxially with one of the main extension axes. Furthermore, in the following the term "radial" in particular designates a direction running perpendicularly to one of the main extension axes. Preferably the main extension axis of the plug-on brush runs parallel to the main extension axis of the electrical toothbrush handpiece. By a "main extension axis" of an object is herein in particular an axis to be understood which runs parallel to a longest edge of a smallest geometrical rectangular cuboid just still completely enclosing the object, and which in particular intersects with a geometrical center of the object.

Furthermore, the terms "upper side" or "front side" of the toothbrush are in particular to be understood, in this context, as that side of the toothbrush which the thumb is laid upon. The upper or front side is usually also that side which the bristle field, in particular the bristle field of the brush head of the plug-on brush, is directed to. As an "underside" or "rear side" of the toothbrush is in particular the side to be understood which faces away from the bristle field of the brush head. Moreover, the terms "lefthand side" and "righthand side" respectively refer to a view of the front side. As an "underside of the head platelet" is that side designated which is laid into the recess of the base body and which points toward the underside of the toothbrush. Correspondingly, the "upper side of the head platelet" points toward the upper side of the toothbrush. The application unit may in particular be "composed" of a base body and a head platelet, which is studded with bristles and/or cleaning elements.

The plug-on brush according to the invention, the electrical toothbrush handpiece, the electrical toothbrush, the system and the method shall herein not be limited to the application and implementation described above. In particular, in order to fulfill a functionality that is described here, the plug-on brush according to the invention, the electrical toothbrush handpiece, the electrical toothbrush, the system and the method may have a number of individual elements, components and units that differs from a number given here.

DRAWINGS

Further advantages will become apparent from the following description of the drawings.

In the drawings an exemplary embodiment of the invention is illustrated. The drawings, the description and the claims contain a plurality of features in combination. Someone skilled in the art will purposefully also consider the features separately and will find further expedient combinations.

Figure 2:
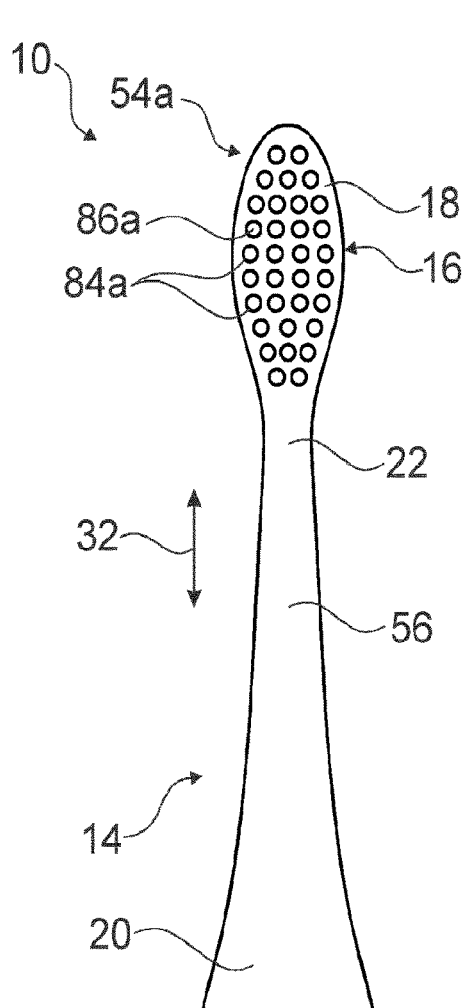
Figure 3:
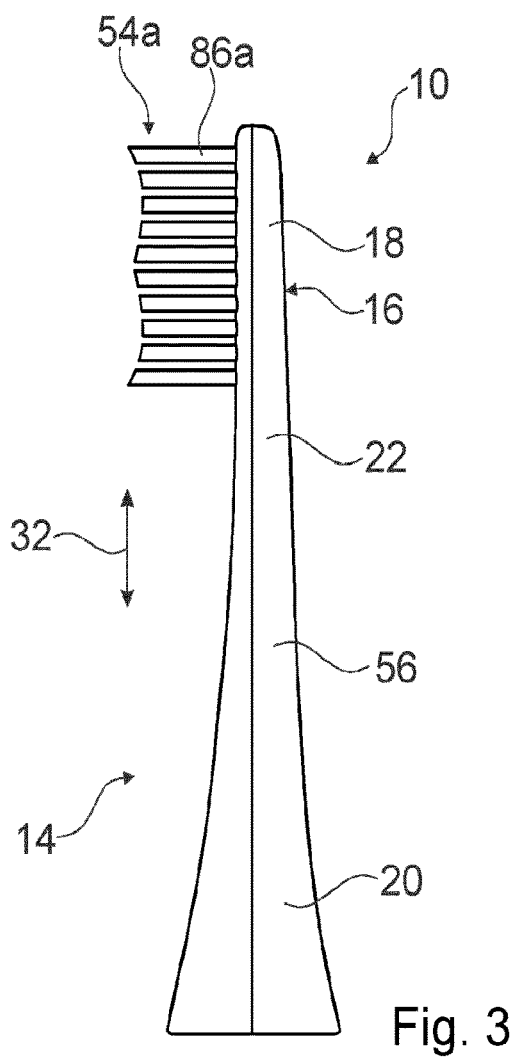
Figure 6:
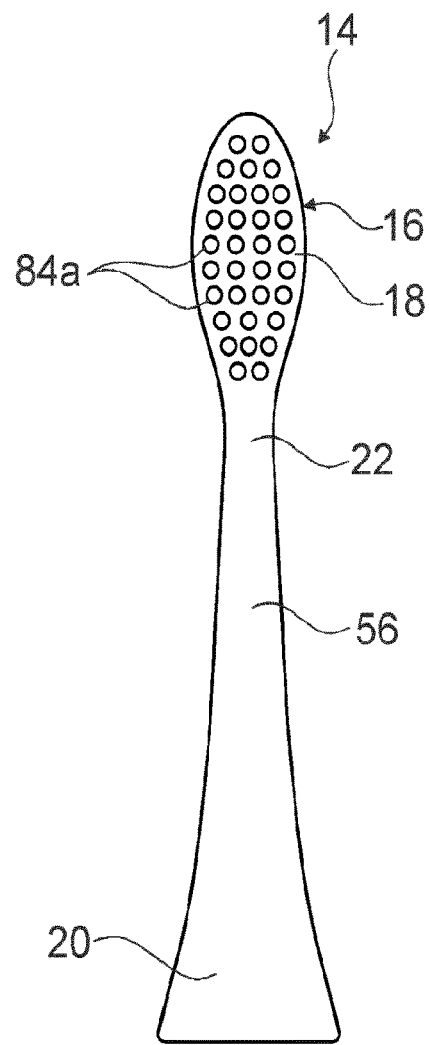
Figure 7:
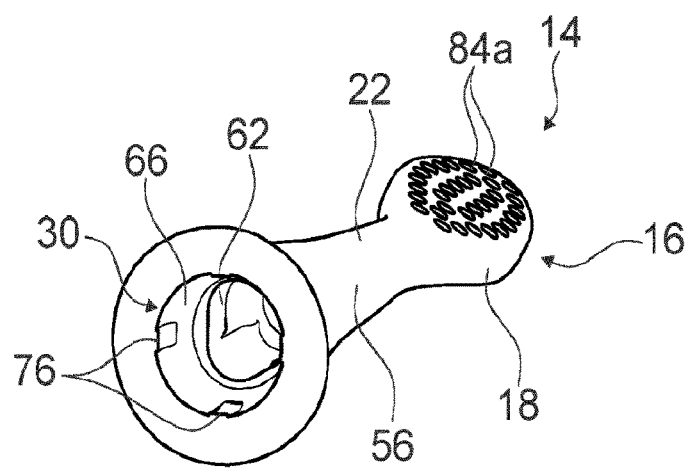
Figure 8:
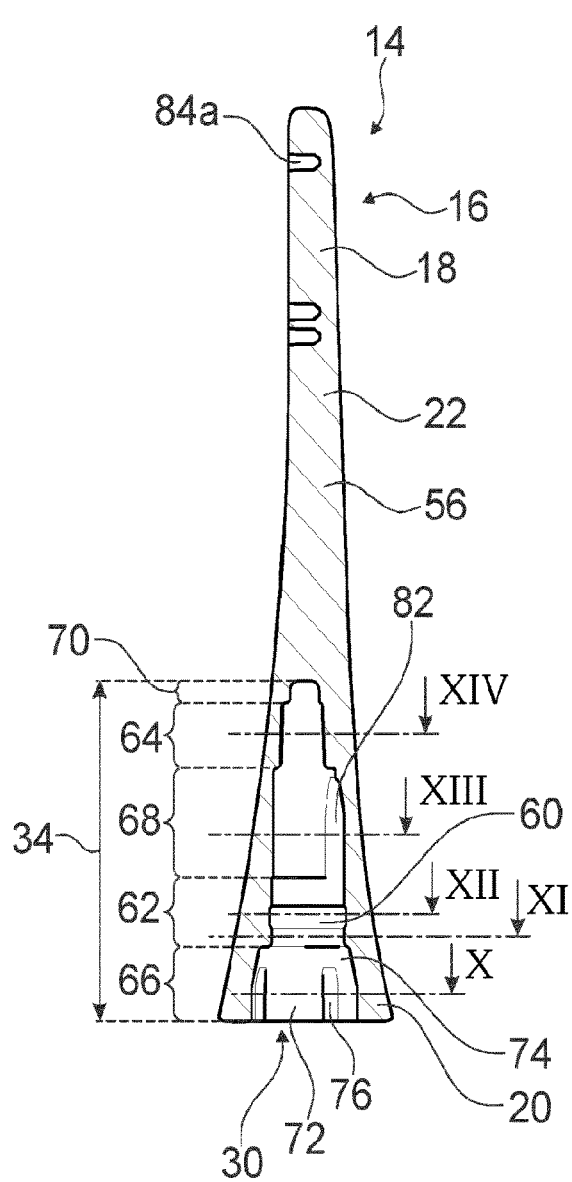
Figure 9:
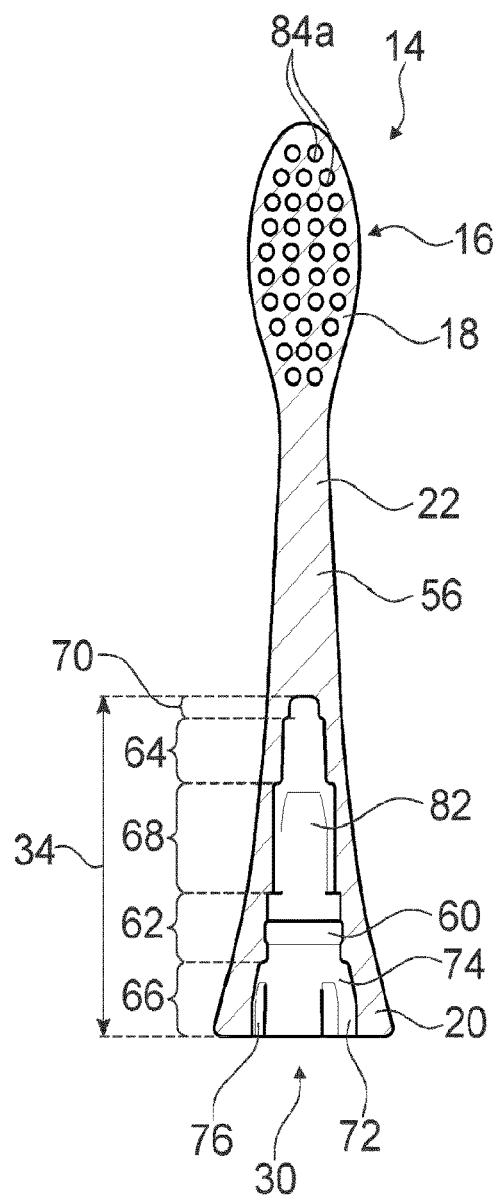
Figure 10:
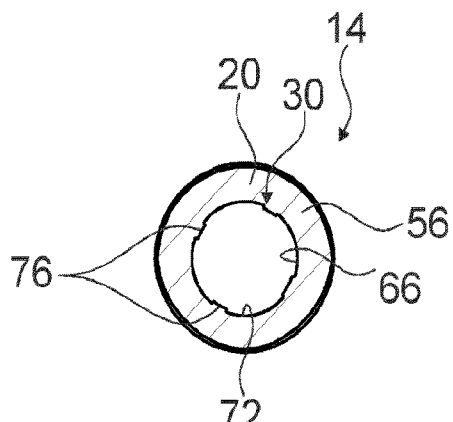
Figure 11:
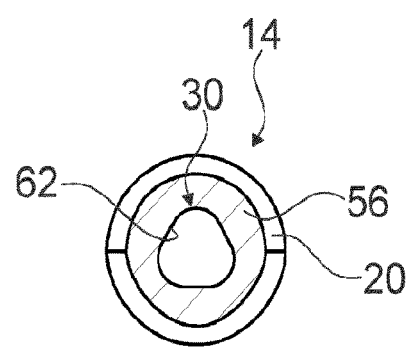
Figure 12:
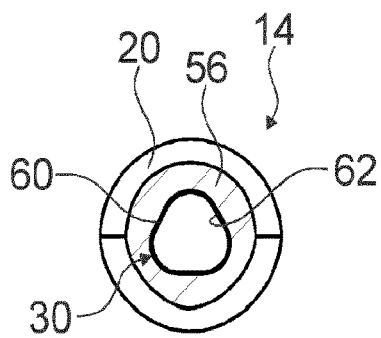
Figure 13:
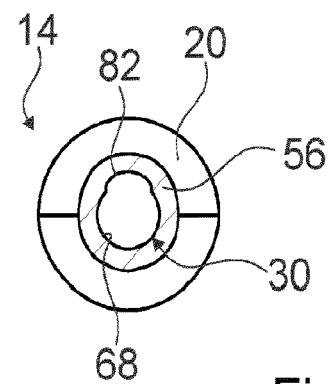
Figure 14:
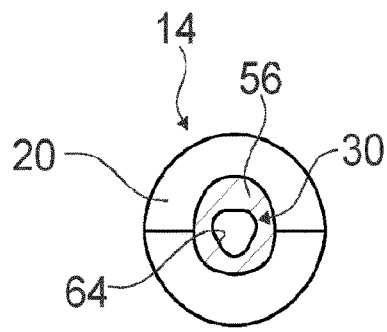
Figure 15:
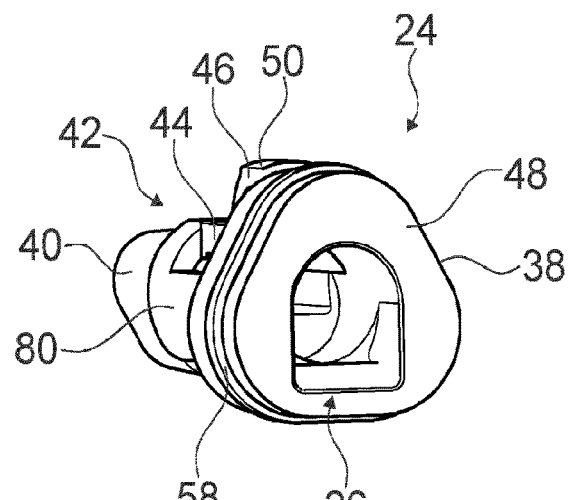
Figure 16:
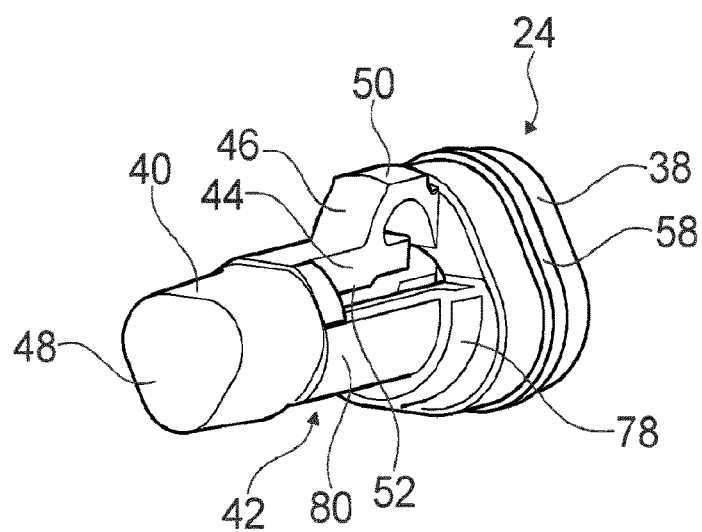
Figure 17:
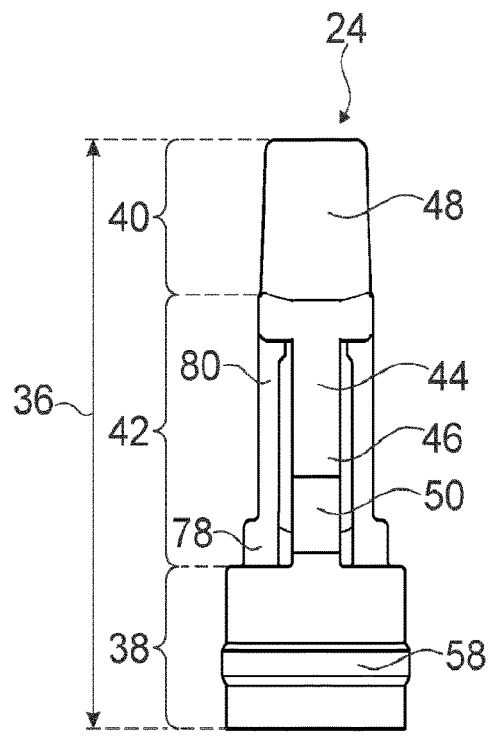
Figure 18:
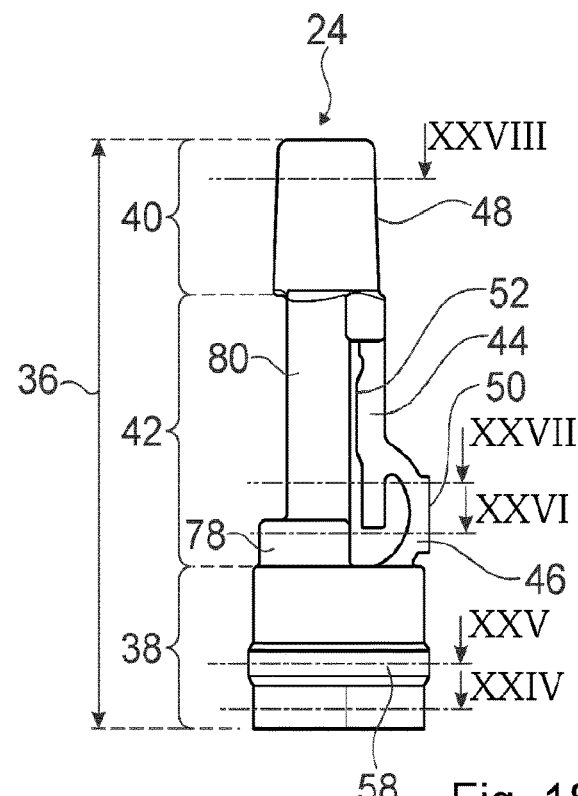
Figure 19:
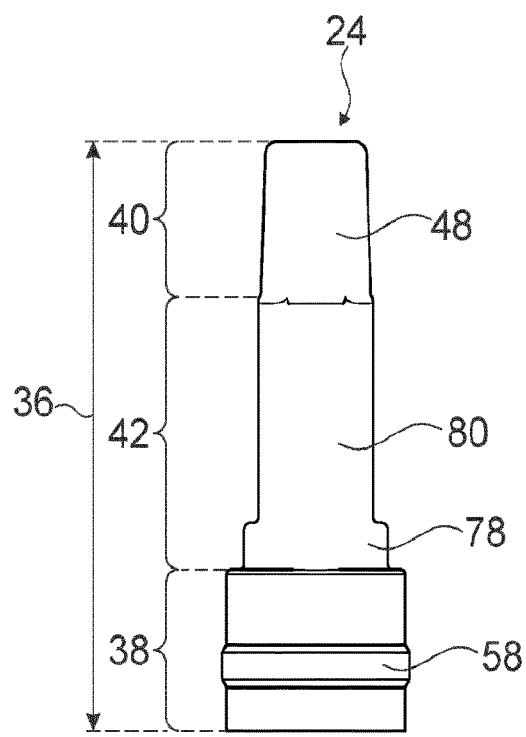
Figure 20:
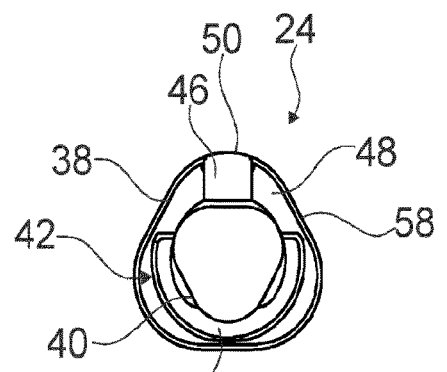
Figure 21:
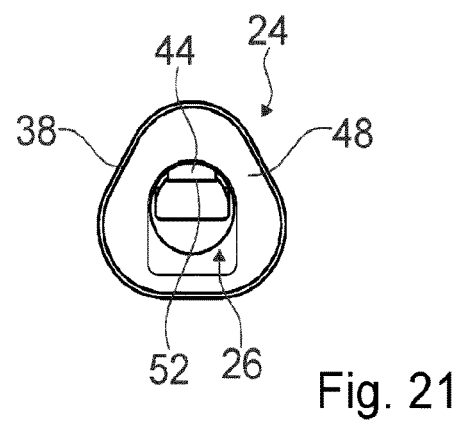
Figure 28:
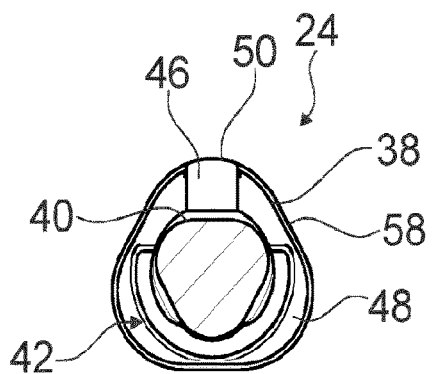
Figure 29:
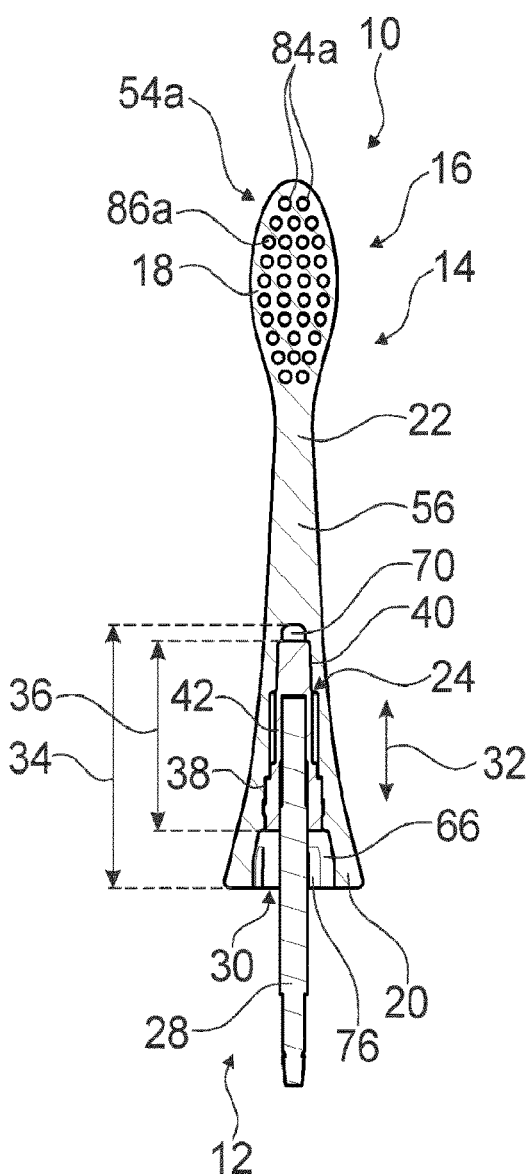
Figure 30:
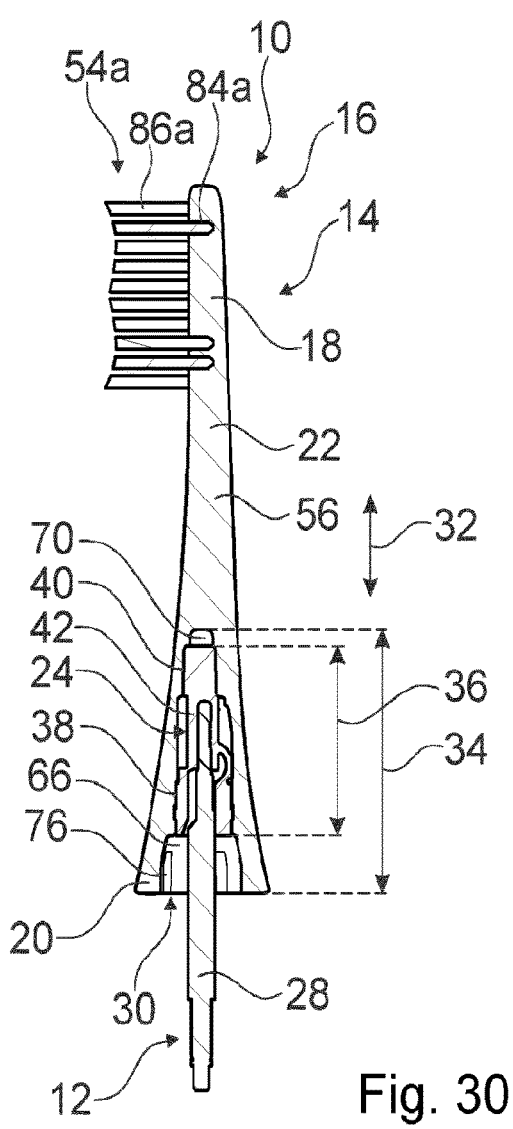
Figure 31:
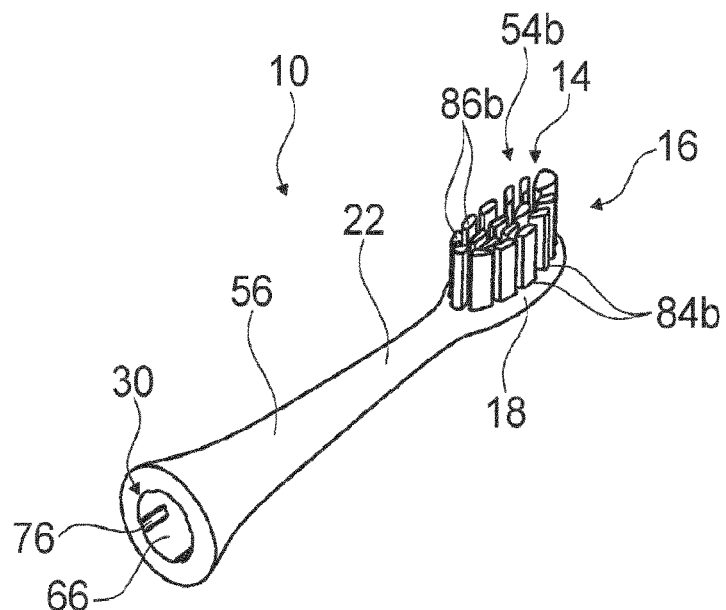
Figure 32:
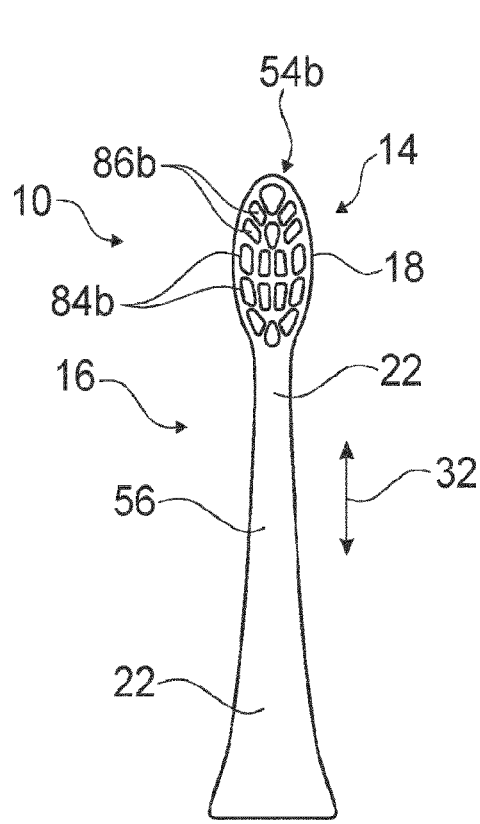
Figure 33:
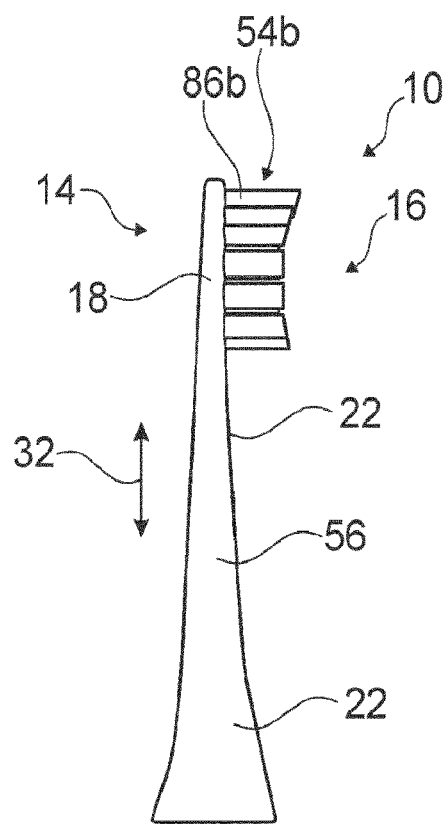
Figure 34:
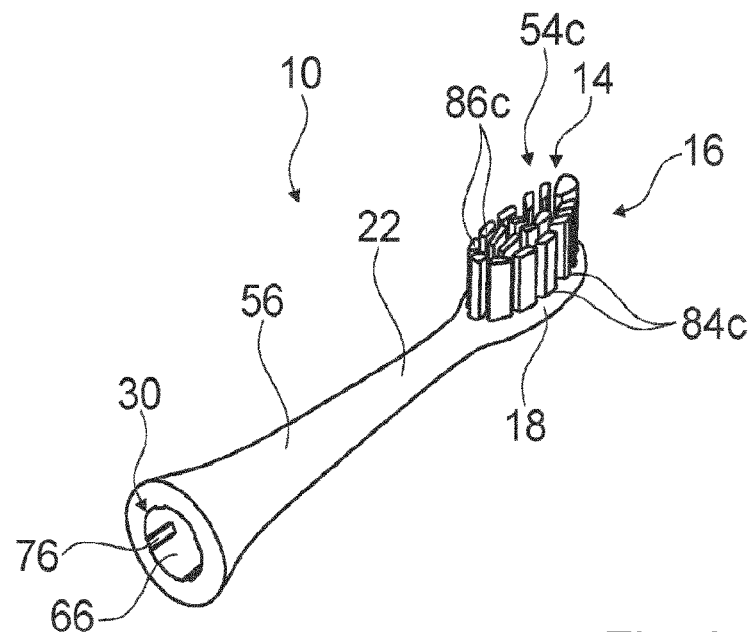
Figure 35:
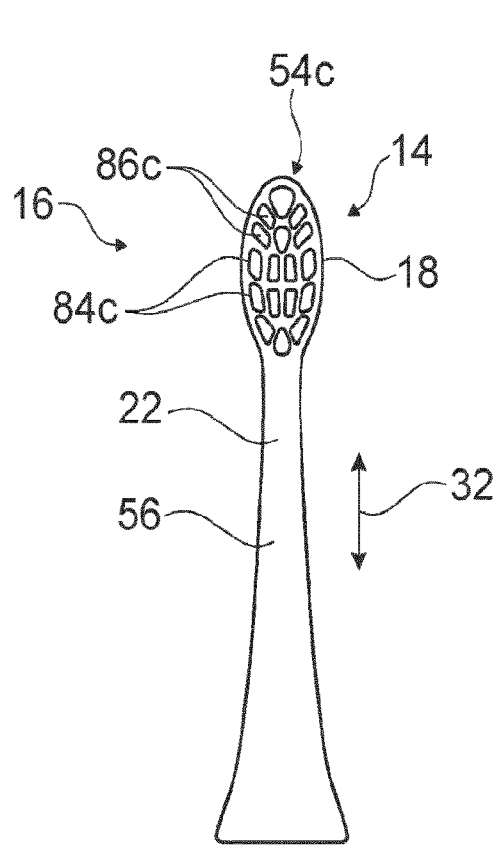
Figure 36:
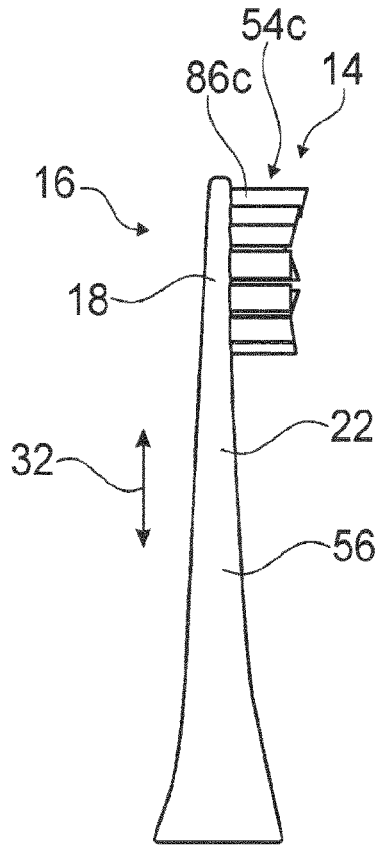

It is shown in:

FIG. 1 a schematic 3D view of a plug-on brush device according to the invention, FIG. 2 a plan view of the plug-on brush device according to the invention from the front, FIG. 3 a plan view of the plug-on brush device according to the invention from a side, FIG. 4 a plan view of the plug-on brush device according to the invention from the rear, FIG. 5 a longitudinal section of the plug-on brush device according to the invention, FIG. 6 a plan view of an application unit of the plug-on brush device according to the invention, from the front, FIG. 7 a 3D view of the application unit of the plug-on brush device according to the invention, FIG. 8 a longitudinal section of the application unit of the plug-on brush device according to the invention, from a side, FIG. 9 a longitudinal section of the application unit of the plug-on brush device according to the invention, from above, FIG. 10 the application unit of the plug-on brush device according to the invention, in a schematic sectional view along the section line X-X, FIG. 11 the application unit of the plug-on brush device according to the invention, in a schematic sectional view along the section line XI-XI, FIG. 12 the application unit of the plug-on brush device according to the invention, in a schematic sectional view along the section line XII-XII, FIG. 13 the application unit of the plug-on brush device according to the invention, in a schematic sectional view along the section line XIII-XIII, FIG. 14 the application unit of the plug-on brush device according to the invention, in a schematic sectional view along the section line XIV-XIV, FIG. 15 a 3D view of an interface accommodation unit of the plug-on brush device from a plugging-on side, FIG. 16 a 3D view of the interface accommodation unit of the plug-on brush device from a free end, FIG. 17 a plan view of the interface accommodation unit of the plug-on brush device from the rear, FIG. 18 a plan view of the interface accommodation unit of the plug-on brush device from a side, FIG. 19 a plan view of the interface accommodation unit of the plug-on brush device from the front, FIG. 20 a plan view of the interface accommodation unit of the plug-on brush device along the longitudinal axis from the free end, FIG. 21 a plan view of the interface accommodation unit of the plug-on brush device along the longitudinal axis from a plugging-on side, FIG. 22 a longitudinal section through the interface accommodation unit of the plug-on brush device from a side, FIG. 23 a longitudinal section through the interface accommodation unit of the plug-on brush device from the rear, FIG. 24 the interface accommodation unit of the plug-on brush device according to the invention, in a schematic sectional view along the section line XXIV-XXIV, FIG. 25 the interface accommodation unit of the plug-on brush device according to the invention, in a schematic sectional view along the section line XXV-XXV, FIG. 26 the interface accommodation unit of the plug-on brush device according to the invention, in a schematic sectional view along the section line XXVI-XXVI, FIG. 27 the interface accommodation unit of the plug-on brush device according to the invention, in a schematic sectional view along the section line XXVII-XXVII, FIG. 28 the interface accommodation unit of the plug-on brush device according to the invention, in a schematic sectional view along the section line XVIII-XVIII, FIG. 29 a longitudinal section through the plug-on brush device with an accommodated interface, from a side, FIG. 30 a longitudinal section through the plug-on brush device with the accommodated interface, from above, FIG. 31 a schematic 3D view of a further plug-on brush device according to the invention, FIG. 32 a plan view of the plug-on brush device according to the invention, from the front, FIG. 33 a plan view of the plug-on brush device according to the invention, from a side, FIG. 34 a schematic 3D view of a further plug-on brush device according to the invention, FIG. 35 a plan view of the plug-on brush device according to the invention from the front, and FIG. 36 a plan view of the plug-on brush device according to the invention from a side.

DESCRIPTION OF THE EXEMPLARY EMBODIMENT

FIGS. 1 to 36 show a plug-on brush device 10. The plug-on brush device 10 is configured for a toothbrush handpiece 12. The plug-on brush device 10 is configured for an electrical toothbrush handpiece 12. The plug-on brush device 10 is implemented by an exchangeable brush. Principally the application of the plug-on brush device 10 and/or of an interface accommodation unit 24, respectively an interface 28, is designed for electrical toothbrushes with a pivoting movement or with an oscillating movement. However, the plug-on brush device 10 and/or the interface accommodation unit 24 may also be utilized for other products, like for example manual toothbrushes, like in particular multi-use toothbrushes, like for example exchangeable-head toothbrushes, alternative electrical toothbrushes, which in particular have translational and/or rotary movements, with plug-on parts comprising interdental cleaners, like in particular interdental brushes with twisted-in bristles and/or tongue cleaners.

In the following FIGS. 1 to 36 will be referred to, which present different views of the plug-on brush device 10. Due to the different views, some elements are not shown in all figures and are therefore not given reference numerals in all figures.

The plug-on brush device 10 comprises an application unit 14. In FIGS. 6 to 14 the application unit 14 is illustrated separately. The application unit 14 comprises a head section 16. The head section 16 comprises a brush head 18. The application unit 14 further comprises a plug-on section 20. Moreover, the application unit 14 comprises a neck section 22 that is arranged between the head section 16 and the plug-on section 20. The head section 16, the plug-on section 20 and the neck section 22 are in each case spatial sections of the application unit 14 of the plug-on brush device 10. The head section 16, the plug-on section 20 and the neck section 22 are in each case axial subsections of the application unit 14 of the plug-on brush device 10. Furthermore, the application unit 14 of the plug-on brush device 10 advantageously consists of exactly three sections, namely the head section 16, the neck section 22 and the plug-on section 20. The sections advantageously directly adjoin each other. The head section 16, the plug-on section 20 and the neck section 22 together extend in an axial direction over the entire plug-on brush device 10.

Viewed from a front side, a general shape of the application unit 14 of the plug-on brush device 10 forms a progression from a larger width in the plug-on section 20 to a narrowing in the neck section 22 to a larger width in the head section 16. The brush head 18 of the plug-on brush device 10 has a long, narrow basic shape. Viewed from a front side, the brush head 18 of the plug-on brush device 10 has a substantially elliptic shape. From a side, the brush head 18 has a slightly decreasing thickness. However, it would also be conceivable that from the side the brush head 18 has a progression, like for example a wave shape, or a constant thickness. Furthermore, additional functional elements, like for example tongue cleaners, may have an influence on this dimension of the brush head 18. The brush head 18 has a height, free of bristles, of 3 mm to 7 mm, preferably of 3.5 mm to 5.5 mm. The brush head 18 further has a length of 20 mm to 35 mm, preferably of 22 mm to 28 mm. The brush head 18 is free of sharp edges. Furthermore, the application unit 14 is shaped substantially rotationally symmetrical in the neck section 22 and in the plug-on section 20, wherein there is a smooth transition toward the head section 16 and the rotational symmetry gets lost. The transition between the neck section 22 and the head section 16 is preferably effected by means of a waisting, which forms a minimal diameter of the application unit 14 of the plug-on brush device 10. However, alternatively a progression free of waisting would also be conceivable. The application unit 14 of the plug-on brush device 10 is herein conical in the neck section 22, with a cross section increasing toward the plug-on section 20. A cone shape of the neck section 22 is continued in the plug-on section 20, wherein furthermore the application unit 14 is in the plug-on section 20 formed concavely and conically toward a free end. At the free end of the plug-on section 20, a standing surface is formed. The standing surface is realized at a free end of the plug-on section 20, which faces away from the brush head 18. A base body 56 of the application unit 14 forms the standing surface. The standing surface is formed by a ring-shaped surface of the base body 56, which is arranged around a longitudinal axis. The standing surface allows setting the plug-on brush device 10 onto a planar surface in such a way that a main extension direction 32 of the plug-on brush device 10 runs substantially perpendicularly to the surface. Whether the standing surface is able to effectively implement its function, depends on a variety of factors influencing the center of gravity, like for example an implementation of a bristle field 54a, in particular of the bristle length, and/or a mass distribution in the body.

The plug-on brush device 10 has an axial length of 60 mm to 100 mm, preferably of 75 mm to 90 mm. The plug-on brush device 10 furthermore has in the head section 16 a width of 7 mm to 15 mm, preferably of 9 mm to 13 mm. In the longitudinal direction the application unit 14 has a progression with a continuous transition to the neck section 22 as well as to the head section 16. A diameter, in particular a maximal height and a maximal width, of the application unit 14 is 13 mm to 21 mm, preferably 16 mm to 19 mm. The neck section 22 of the application unit 14 forms a minimal width from 4 mm to 7 mm, preferably from 4.5 mm to 5.5 mm. A minimal height of the application unit 14 is not clearly definable as there is a progression starting from the rear end and a minimal height is in particular located at the front end of the head section 16. A narrowest point of the neck section 22 is located in the region of the transition from the neck section 22 to the head section 16.

Beyond this the application unit 14 comprises the load-bearing base body 56. The load-bearing base body 56 comprises a hard component. The load-bearing base body 56 is made of a hard component. Principally, however, it would also be conceivable that the base body 56 is made of several different hard components. This would in particular allow achieving different characteristics in different body portions of the base body 56 with the different components. Alternatively, synthetic materials having different densities may be used. For vibrating toothbrushes—like sound, ultrasound, etc.—the mass distribution in the product may be extremely relevant for the spreading of the vibrations. For example, components of the base body 56 of the application unit 14 or other components might be implemented having a high density in order to increase weight and to thus optimize vibrations. Furthermore, by heavy regions a certain weight distribution may be achieved in order to obtain optimal oscillation. For example, using a second heavy hard material, in particular 2K injection-molding, a ring may injection-molded, preferably even within, invisibly. Furthermore, three hard components and/or a combination with soft components are/is also conceivable. The load-bearing base body 56 forms a load-bearing structure of the application unit 14. The load-bearing base body 56 extends from the plug-on section 20 via the neck section 22 to the head section 16. The base body 56 is realized integrally. It would, however, principally also be conceivable that the base body 56 is interrupted at least partly and, for example, the application unit 14 comprises a mobile joint via which the brush head is supported movably.

The brush head 18 comprises the defined bristle field 54*a*. The brush head 18 comprises a perforated field 84*a*. An illustrated perforated field 84*a* of the brush head 18 is, as shown, designed for the implementation of the customary anchor-punching method for forming bristle bundles 86*a*. The perforated field 84*a* comprises three regions. The perforated field 84*a* comprises a front region that is oriented toward the free end. The front region comprises two transversal rows. A foremost row has two perforations while a second row has three perforations. The perforated field 84*a* has an increasing number of perforations toward a middle region of the perforated field 84*a*. The middle region of the perforated field 84*a* is arranged in the center of the perforated field 84*a* and comprises five transversal rows. The transversal rows in each case have four perforations. The perforated field 84*a* further comprises a rear region, which is oriented toward the neck of the brush. The rear region comprises three transversal rows. A first transversal row adjoining the middle region has three perforations. Then follows another row having three perforations. At the free end a further transversal row is provided which has two perforations. The number of perforations decreases toward the neck section 22. In order to create the different regions, the perforations are arranged in transversal rows, thus allowing optimal displacement and hence optimal cutting/profiling of the bristles.

The plug-on brush device 10 further comprises the interface accommodation unit 24, which includes an interface accommodation 26 for receiving the interface 28 of a toothbrush handpiece 12. The interface accommodation unit 24 is shown separately in FIGS. 15 to 28. The interface accommodation unit 24 is realized separately. The plug-on section 20 of the application unit 14 comprises a receiving region 30 for a loss-proof, at least substantially complete accommodation of the interface accommodation unit 24. The receiving region 30 is configured for a complete accommodation of the interface accommodation unit 24. An extent 34 of the receiving region 30 of the plug-on section 20 along the main extension direction 32 of the plug-on brush device 10 is larger than an extent 36 of the interface accommodation unit 24 along the main extension direction 32. An extension range of the interface accommodation unit 24 is situated along the main extension direction 32 completely within an extension range of the receiving region 30 of the plug-on section 20 along the main extension direction 32.

The interface accommodation unit 24 is realized in a one-part implementation. The interface accommodation unit 24 is made of a material that differs from the application unit 14. The material of the interface accommodation unit 24 has a higher hardness than a material of the base body 56 of the application unit 14. The interface accommodation unit 24 and the base body 56 of the application unit 14 consist of a hard component. The interface accommodation unit 24 is made of a synthetic material. The interface accommodation unit 24 is made of POM. The interface accommodation unit 24 has an elasticity modulus of 2,300 MPa. The interface accommodation unit 24 is produced in an injection-molding procedure. The application unit 14 consists in particular at least largely, in particular completely, of a hard component. The application unit 14 is made of polypropylene. The synthetic material of the application unit 14 has an elasticity modulus of 1,400 MPa. The application unit 14 is produced in an injection-molding procedure.

Furthermore, the interface accommodation unit 24 comprises a first fixing region 38, which is configured for a direct contact with the receiving region 30 of the plug-on section 20 and has an at least approximately triangular cross section. The first fixing region 38 is configured for a direct form-fit connection with the plug-on section 20 of the application unit 14. The first fixing region 38 is configured to latch in the receiving region 30 of the plug-on section 20 with the plug-on section 20 of the application unit 14. The first fixing region 38 is configured to latch in the receiving region 30 of the plug-on section 20 with the plug-on section 20 of the application unit 14 in the second sub-receiving region 62. The first fixing region 38 realizes a first zone of the interface accommodation unit 24. The first fixing region 38 realizes a holding zone of the interface accommodation unit 24. The total length of the first fixing region 38 is 4 mm to 8 mm, preferably 5 mm to 7 mm. An outer side of the first fixing region 38 has a triangular cross section with rounded corners. The first fixing region 38 further comprises a protruding ring 58 on its outer surface. The ring 58 is implemented so as to be radially protruding and circumferential relative to the basic shape of the first fixing region 38. The ring 58 in particular serves for a connection between the interface accommodation unit 24 and the plug-on section 20. Viewed in a plane parallel to the main extension direction of the interface accommodation unit 24, the ring 58 has an approximately rectangular cross section. However, other cross-section shapes are also conceivable, like for example trapezoid-shaped or semi-circular. The shape of the ring 58 is adapted to a recess 60 in the receiving region 30 of the plug-on section 20. The shape of the ring 58 is adapted to a recess 60 in the second sub-receiving region 62 in the receiving region 30 of the plug-on section 20. The ring 58 of the first fixing region 38 of the interface accommodation unit 24 is configured to latch with the plug-on section 20 of the application unit 14. The ring 58 has a length, in particular an extent parallel to the main extension direction of the interface accommodation unit 24, of 0.5 mm to 2 mm, preferably of 0.9 mm to 1.5 mm. Furthermore, the ring 58 has a height, in particular an elevation with respect to the basic shape of the first fixing region 38, of 0.1 mm to 0.7 mm, preferably of 0.2 mm to 0.5 mm. A middle of the elevation of the ring 58 has a distance of 1 mm to 4.5 mm, preferably of 2.5 mm to 3.5 mm, from a free rear end of the interface accommodation unit 24. The middle of the elevation of the ring 58 is situated, relative to a length of the first fixing region 38, after 25% to 65%, preferably 40% to 60% of the total length of the first fixing region 38 measured from the lower edge, i.e. the edge at the free end of the first fixing region 38. The first fixing region 38 of the interface accommodation unit 24 moreover has an opening for the insertion of the interface 28 of the toothbrush handpiece 12. The opening is realized by an opening of the interface accommodation 26. The first fixing region 38 has a recess which extends through the entire first fixing region 38 and forms a portion of the interface accommodation 26. The recess has a half-side rectangular and half-side semi-circular cross section. The recess forms a first section of the interface accommodation 26. The interface accommodation 26 is furthermore widened toward the opening. The rectangular half-side of the recess increases continuously toward the opening. The first fixing region 38 serves as an insertion opportunity and for a centering of the interface accommodation unit 24.

Beyond this the receiving region 30 of the plug-on section 20 comprises a second sub-receiving region 62 that corresponds to the first fixing region 38. The second sub-receiving region 62 is embodied by a first orientation region. The second sub-receiving region 62 has a cylindrical shape with a triangular cross section having rounded corners. The second sub-receiving region 62 serves for a first orientation of the interface accommodation unit 24, in particular during assembly. The second sub-receiving region 62 furthermore forms a first connection region. The second sub-receiving region 62 has the circumferential recess 60, which is realized correspondingly to the ring 58 of the first fixing region 38. The protruding ring 58 of the first fixing region 38 is configured to engage in the recess 60 of the second sub-receiving region 62. As a basic shape the second sub-receiving region 62 in particular has a straight cylinder, which the recess 60 is introduced into. The cylindrical basic shape has a triangular cross section with rounded corners. The cylindrical basic shape may have a minimal conicity, such that forming, respectively uniforming, of the recess is possible. The second sub-receiving region 62 has a length of 4 mm to 8 mm, preferably of 5 mm to 7 mm. The cylindrical basic shape of the second sub-receiving region 62 has a width, in particular measured perpendicularly to the bristles, of 4 mm to 8 mm, preferably of 5 mm to 7 mm. Furthermore, the cylindrical basic shape of the second sub-receiving region 62 has a height, in particular measured perpendicularly to the main extension direction, of 5 mm to 9 mm, preferably of 6 mm to 8 mm. The embedded circumferential recess 60 has a width of 0.8 mm to 2 mm, preferably of 1 mm to 1.5 mm. The embedded circumferential recess 60 furthermore has a depth of 0.1 mm to 0.7 mm, preferably of 0.2 mm to 0.5 mm. The embedded circumferential recess 60 is embodied correspondingly to the ring 58 of the first fixing region 58. Viewed in a plane parallel to the main extension direction 32, the embedded circumferential recess 60 in particular has a rectangular cross-section shape. A middle of the embedded circumferential recess 60 is situated, relative to a length of the second sub-receiving region 62, after 25% to 65%, preferably after 40% to 60%, of the total length of the second sub-receiving region 62 measured from the lower edge of the second sub-receiving region 62. The recess 60 of the second sub-receiving region 62 is realized so as to be circumferential. It would however be also conceivable that the recess 60 and/or the ring 58 of the first fixing region 38 are/is interrupted.

The interface accommodation unit 24 further comprises a second fixing region 40, which is spaced apart from the first fixing region 38, which is configured for a direct contact with the receiving region 30 of the plug-on section 20 and has an at least approximately triangular cross section. The cross section of the second fixing region 40 is rotated with respect to the cross section of the first fixing region 38. The cross section of the second fixing region 40 is rotated by 180°, respectively by 60°, with respect to the cross section of the first fixing region 38. The second fixing region 40 is oriented differently than the first fixing region 38, which results in a certain rotational securing. The second fixing region 40 forms a third zone of the interface accommodation unit 24. The second fixing region 40 realizes a centering zone. The second fixing region 40 serves for centering the interface accommodation unit 24 in the receiving region 30 of the plug-on section 20. The second fixing region 40 has a total length of 3 mm to 8 mm, preferably of 5 mm to 7 mm. An outer side of the second fixing region 40 has a cylindrical shape with a triangular cross section having rounded corners. The second fixing region 40 is free of an interior recess. The second fixing region 40 is free of the interface accommodation 26. An end of the interface 28 of the toothbrush handpiece 12 extends in an accommodated state as far as a rear end at the end of a spring section 42 of the interface accommodation unit 24. The interface 28 does not engage into the second fixing region 40. The spring section 42 is arranged between the first fixing region 38 and the second fixing region 40. The spring section 42 connects the first fixing region 38 and the second fixing region 40. All in all, the interface accommodation unit 24 comprises exactly three zones along the main extension direction 32, namely the holding zone that forms the first fixing region 38, a spring zone that forms the spring section 42, and the centering zone that forms the second fixing region 40. The second fixing region 40 ensures an unambiguous orientation of the interface accommodation unit 24 in the receiving region 30, in particular in assembly. The second fixing region 40 moreover serves as a holding region for a firm holding of the interface accommodation unit 24 with respect to the application unit 14. In the second fixing region 40, the interface accommodation unit 24 is all around adjacent to the receiving region 30 of the plug-on section 20 of the application unit 14. The second fixing region 40 furthermore serves for a force transmission and for a pressing during assembly. Beyond this, the receiving region 30 of the plug-on section 20 of the application unit 14 comprises a fourth sub-receiving region 64 that corresponds to the second fixing region 40. The fourth sub-receiving region 64 is embodied by a plugging-in zone. The fourth sub-receiving region 64 serves for a further orientation and rotational securing of the interface accommodation unit 24, in particular during assembly. The fourth sub-receiving region 64 has a cylindrical shape with a triangular cross section having rounded corners. The cylinder may have a minimal conicity such that forming and/or uniforming of the receiving region 30 is possible. The fourth sub-receiving region 64 has a length of 3 mm to 8 mm, preferably of 5 mm to 6.5 mm. Furthermore, the fourth sub-receiving region 64 has a width, preferably measured perpendicularly to the bristles, of 3 mm to 6 mm, preferably of 4 mm to 5 mm. The fourth sub-receiving region 64 further has a height, preferably measured in the bristle direction, of 3 mm to 6 mm, preferably of 4 mm to 5 mm. In particular, the fourth sub-receiving region 64 serves for holding the second fixing region 40. The cross section of the fourth sub-receiving region 64 with the slightly conical shape in particular serves to enable an optimal fixing of the interface accommodation unit 24 in the application unit 14. When the interface accommodation unit 24 is slid in, the contact with the surface of the fourth sub-receiving region 64 of the receiving region 30 takes place rather late, such that the force occurs only by the end of sliding-in. Furthermore, the conicity enables uniforming during production. Beyond this, the fourth sub-receiving region 64 serves for a force transmission.

The receiving region 30 of the application unit 14 comprises five sub-receiving regions 62, 64, 66, 68, 70, which are arranged behind one another along the main extension direction 32. A first sub-receiving region 66 is implemented by a run-in zone. A third sub-receiving region 68 is implemented by a spring zone. A fifth sub-receiving region 70 is implemented by an empty space. An opening of the receiving region 30 of the plug-on section 20 of the application unit 14 directly adjoins the first sub-receiving region 66. The fifth sub-receiving region 70 forms a closed end of the receiving region 30 of the plug-on section 20. The third sub-receiving region 68 is arranged exactly between the second sub-receiving region 62 and the fourth sub-receiving region 64. The transition from the second sub-receiving region 62 to the third sub-receiving region 68 is realized by a diameter leap and/or cross-section leap. The transition from the third sub-receiving region 68 to the fourth sub-receiving region 64 is realized by a diameter leap and/or cross-section leap on all sides. The transition from the first sub-receiving region 66 to the second sub-receiving region 62 is realized by a non-continuous ledge and/or a non-continuous step. The second sub-receiving region 62 is arranged centrically with respect to the first sub-receiving region 66.

A connection between the interface accommodation unit 24 and the application unit 14 is effected substantially via the first fixing region 38 interacting with the second sub-receiving region 62, and via the second fixing region 40 interacting with the fourth sub-receiving region 64. The fixing is realized by the ring 58 of the first fixing region 38 latching in the recess 60 in the second sub-receiving region 62 and by the clamping of the second fixing region 40 in the fourth sub-receiving region 64. The ring 58 adjoins the recess 60 of the second sub-receiving region 62 on a side facing toward the opening of the receiving region 30. Furthermore, the second fixing region 40 is pressed into the fourth sub-receiving region 64 and is centered. The angles of the second fixing region 40 and the further sub-receiving region 64 match each other. In a mounted state of the interface accommodation unit 24, there is tensioning between the ring 58 of the first fixing region 38 and the clamping of the second fixing region 40. A holding force that is between 5 kg and 20 kg, preferably between 7.5 kg and 12.5 kg, is generated between the interface accommodation unit 24 and the application unit 14. A mounting force, that is the force required for mounting the interface accommodation unit 24 into the application unit 14, amounts to 10 kg to 21 kg, preferably 13 kg to 19 kg.

The first sub-receiving region 66 of the receiving region 30 of the plug-on section 20 is implemented by a run-in zone. The first sub-receiving region 66 is implemented by a clearance. In the first sub-receiving region 66 the application unit 14 has no contact to the interface accommodation unit 24 nor to the toothbrush handpiece 12. In the first sub-receiving region 66, the interface 28 of the toothbrush handpiece 12 is free-standing without a contact to the application unit 14 and to the interface accommodation unit 24. The total length of the first sub-receiving region 66 is 5 mm to 10 mm, preferably 6 mm to 8 mm. The first sub-receiving region 66 has a first partial region 72 in the shape of a straight circular cylinder. The first partial region 72 has a length of 2 mm to 4 mm, preferably of 2.5 mm to 3.5 mm. The diameter of the first partial region 72 of the first sub-receiving region 66 is 7 mm to 13 mm, preferably 9 mm to 11 mm. A front end of the first partial region 72 is followed by a second partial region 74, which has a narrowing toward the center of the receiving region 30. The second partial region 74 forms a truncated-cone-shaped recess. The length of the second partial region 74 of the first sub-receiving region 66 is 3 mm to 5 mm, preferably 3.5 mm to 4.5 mm. A smallest diameter of the second partial region 74, in particular on a side facing away from the first partial region 72, is 6 mm to 12 mm, preferably 8 mm to 10 mm. On an inner side of the first sub-receiving region 66 there are pedestals 76 which protrude into the recess. The pedestals 76 continue from the first partial region 72 into the second partial region 74 of the first sub-receiving region 66. The pedestals 76 extend at least substantially parallel to the extension direction 36 of the interface accommodation unit 24. The pedestals 76 are arranged so as to be regularly distributed in the circumferential direction. The pedestals 76 are arranged symmetrically to a plane that extends through a middle axis of the interface accommodation unit 24. Respectively two and two pedestals 76 are arranged crosswise symmetrically, in particular in a centrally symmetrical fashion. The orientation of the pedestals 76 is always such that they correspond, for the function, with a respective counter element. The function of the pedestals 76 is to support the plug-on brush device 10. There are support positions for plug-on brush devices 10 on a charging station for the toothbrush handpiece 12, such that—for example in a household—a manual appliance can be used by two persons. The geometry of the support stubs in the support positions, which are configured for the plug-on brush devices 10 to be stuck on, is formed differently than the principal interface geometry of the plug-on brush device 10. The pedestals 76 thus make it possible that the plug-on brush devices 10, on the one hand, fit onto the toothbrush handpiece 12 and, on the other hand, can be stuck onto the charging station. The pedestals 76 are shaped such that they enable the clamping between the plug-on brush device 10 and the charging station. The pedestals 76 have a width of 1 mm to 3 mm, preferably of 1.5 mm to 2.5 mm. The pedestals 76 further have a height of 0.1 mm to 1 mm, preferably of 0.1 mm to 0.4 mm. The length of the pedestals 76 corresponds to the height of the support stubs at the charging appliance. In particular, the length is equivalent at least to the height of the support stubs, that is in particular 2 mm to 10 mm, preferably 3.5 mm to 6.5 mm.

The fifth sub-receiving region 70 is implemented by an empty space. A transition from the fourth sub-receiving region 64 to the fifth sub-receiving region 70 is realized by a diameter leap and/or cross-section leap on all sides. The total length of the fifth sub-receiving region 70 amounts to 0.5 mm to 3 mm, preferably 1.5 mm to 2.5 mm. The cross section is reduced relative to the preceding cross section of the fourth sub-receiving region 64. The fifth sub-receiving region 70 is centered with respect to the mounted interface accommodation unit 24. The fifth sub-receiving region 70 serves for receiving a gate mark of the interface accommodation unit 24. The gate mark of the interface accommodation 26 is situated at a front end of the second fixing region 40. In the assembled state, the fifth sub-receiving region 70 forms an empty region. Preferably the fifth sub-receiving region 70 moreover serves as a compression region for retained air during a mounting of the interface accommodation unit 24 in the receiving region 30. Furthermore, the fifth sub-receiving region 70 realizes a clearance for the gate mark of the interface accommodation unit 24. Due to the clearance in the assembled state, mounting is possible with a flat gate mark as well as with a protruding gate mark.

The interface accommodation unit 24 further comprises the spring section 42. The spring section 42 is configured, in a state when the interface 28 of the toothbrush handpiece 12 is accommodated, to exert a tension force onto the interface 28 of the toothbrush handpiece 12. The spring section 42 extends between the first fixing region 38 and the second fixing region 40. The spring section 42 has a total length of 8 mm to 13 mm, preferably of 9.5 mm to 11.5 mm. The spring section 42 has an at least approximately circle-cylindrical basic shape. The spring section 42 has a cylindrical basic shape with a circle-segment-shaped cross section. The cylindrical basic shape in particular forms a portion of the base body 48 of the interface accommodation unit 24. The basic shape of the spring section 42 has a first partial region 78. The first partial region 78 directly adjoins the first fixing region 38 and is arranged on a front side of the interface accommodation unit 24. The first partial region 78 has a circle-segment-shaped cross section with a semi-cylindrical recess that is open toward a rear side. The semicylindrical recess forms a portion of the interface accommodation 26. The semicylindrical recess forms a second section of the interface accommodation 26. The basic shape of the spring section 42 further comprises a second partial region 80. The second partial region 80 directly adjoins the second fixing region 40 and is arranged on a front side of the interface accommodation unit 24. The second partial region 80 is arranged between the first partial region 78 and the second fixing region 40. The second partial region 80 has a circle-segment-shaped cross section, which is reduced relative to the first partial region 78 and is flattened toward a front side. The second partial region 80 has a rectangular recess, which is open toward a rear side. The rectangular recess forms a portion of the interface accommodation 26. The rectangular recess forms a third section of the interface accommodation 26. The rectangular recess forms a last section of the interface accommodation 26, in which the interface 28 gets clamped. The rectangular recess and the semicylindrical recess are arranged on an inner side of the spring section 42 and form a receiving region for receiving a partial region, in particular the free end, of the interface 28 of the toothbrush handpiece 12. The receiving region of the spring section 42 forms an important interaction zone to the interface 28 of the toothbrush handpiece 12. The spring section 42 serves for ensuring an unambiguous orientation of the interface 28, in particular of the axle, to the plug-on brush device 10. In an accommodated state, the interface 28 is adjacent to the inner side of the spring section 42 on the front side. The basic shape of the spring section 42 altogether forms a half-pipe-shaped tub for receiving the interface 28. In particular, a tub is formed, wherein the termination of the tub forms a clearance. In a front region of the spring section 42, on a side that faces toward the second fixing region 40, the second partial region 80 of the basic shape of the spring section 42 has a blind hole. The spring section 42 has on its outer side only discrete contact points and/or contact surfaces with the application unit 14. The spring section 42 has principally clearance.

The third sub-receiving region 68 of the receiving region 30 of the plug-on section 20, which is implemented as a spring zone, is realized so as to correspond to the spring section 42. The third sub-receiving region 68 is arranged eccentrically with respect to the second sub-receiving region 62. A geometry of the receiving region 30 on a side of the receiving region 30 facing toward the rear side of the application unit 14 continues between the second sub-receiving region 62 and the third sub-receiving region 68. On a a righthand side and a lefthand side of the receiving region 30 which face away from the application unit 14, there is a diameter leap between the second sub-receiving region 62 and the third sub-receiving region 68. The side of the receiving region 30 that faces toward the rear side of the application unit 14 forms a support zone for a spring element of the spring section 42 of the interface accommodation unit 24. The third sub-receiving region 68 has a total length of 8 mm to 13 mm, preferably of 10 mm to 11.5 mm. There is an interaction between the total length and the spring section 42 of the interface accommodation unit 24. Preferably the interface accommodation unit 24 should in the correspondence region have the same length as the third sub-receiving region 68 of the application unit 14. The length of the interface accommodation unit 24 is selected such that the spring section 42 functions in the manner required. The third sub-receiving region 68 has a circle-shaped cross-section shape with a protuberance 82. The protuberance 82 is arranged on the rear side of the receiving region 30. The protuberance 82 corresponds to the rear side of the interface accommodation unit 24. A highest point, in particular a point facing toward the front side, of the receiving region 30 continues from the second sub-receiving region 62 into the third sub-receiving region 68. This serves for an insertion of the interface accommodation unit 24 during assembly, wherein during an insertion the front side of the interface accommodation unit 24 is located on a continuous surface.

The spring section 42 comprises a spring bar element 44 and a bow spring element 46. In an accommodated state of the interface 28 of the toothbrush handpiece 12, the spring bar element 44 and the bow spring element 46 are in each case configured to exert a tension force onto the interface 28 of the toothbrush handpiece 12. The spring bar element 44 is embodied by a bar-shaped spring element having a rectangular basic shape. The bow spring element 46 is embodied by a circular-arc-shaped spring element. The bow spring element 46 is embodied by an arc-shaped and/or bridge-like spring element. The bow spring element 46 in particular comprises a circular-arc segment of 80° to 140°, preferably of 90° to 110°. The spring bar element 44 and the bow spring element 46 are embodied integrally. The spring bar element 44 and the bow spring element 46 are partially connected behind each other in series. The spring bar element 44 and the bow spring element 46 exert a spring force substantially perpendicularly to the main extension direction of the interface accommodation unit 24. In an operation state, the spring bar element 44 and the bow spring element 46 are tensioned between the application unit 14 and the interface 28. The spring bar element 44 has clearance sideways and at the rear. The spring bar element 44 is substantially implemented so as to be free-standing. In a relaxed state, the spring bar element 44 extends parallel to the main extension direction 32, in particular at a little distance from a middle axis of the interface accommodation unit 24. A width of the sideways clearance, in particular measured on one side, is 0.1 mm to 1 mm, preferably 0.25 mm to 0.75 mm. A length of the clearance in total along the main extension direction 32 is 5 mm to 11 mm, preferably 8 mm to 9.5 mm. A length of the clearance corresponds to a length of the spring bar element 44 together with the bow spring element 46. The spring bar element 44 and the bow spring element 46 together form a clamping element. The clamping element with the spring bar element 44 and the bow spring element 46 is configured to exert a clamping force onto the interface 28 of the toothbrush handpiece 12. The clamping force defines the pull-off force of the plug-on brush device 10 from the interface 28 of the toothbrush handpiece 12. The clamping force is smaller than the force for removing the interface accommodation unit 24 out of the application unit 14. The clamping force is defined via a pull-off force, hence the force required for removing the mounted plug-on brush device 10 from the interface 28 of the toothbrush handpiece 12. The pull-off force is an interaction between the interface 28 of the toothbrush handpiece 12 and the plug-on brush device 10. In a state when the toothbrush handpiece 12 is connected with the plug-on brush device 10, the interface 28 of the toothbrush handpiece 12 is in line with a bristle surface of the plug-on brush device 10. A pull-off weight of the plug-on brush device 10 from the interface 28 amounts to 0.75 kg to 3.5 kg, preferably 1.2 kg to 2.8 kg.

The spring bar element 44 and the bow spring element 46 are in each case with one end connected to a base body 48 of the interface accommodation unit 24, wherein the ends face away from each other. The spring bar element 44 is connected to the base body 48 of the interface accommodation unit 24 with a front end and is connected to the bow spring element 46 with a rear end, wherein the ends face away from each other. The spring bar element 44 is connected to the second fixing region 40 with a front end. The bow spring element 46 is connected to the base body 48 of the interface accommodation unit 24 with a rear end and is connected to the spring bar element 44 with a front end, wherein the ends face away from each other. The bow spring element 46 is connected to the first fixing region 38 with a rear end. The spring bar element 44 is connected to the base body 48 of the interface accommodation unit 24 additionally via the bow spring element 46. The spring bar element 44 and the bow spring element 46 together form a bar that extends along the main extension direction 36 of the interface accommodation unit 24, which extends over the entire spring section 42. The spring bar element 44 and the bow spring element 46 are arranged on a rear side of the spring section 42, which is situated opposite the basic shape of the spring section 42.

The bow spring element 46 is configured to be supported on an inner surface of the receiving region 30 of the plug-on section 20. The bow spring element 46 is configured to generate a tension force between the inner surface of the receiving region 30 of the plug-on section 20 and the interface 28 of the toothbrush handpiece 12. The bow spring element 46 is supported in a middle region, spaced apart from the ends, on the inner surface of the receiving region 30 of the plug-on section 20. The bow spring element 46 is supported, on a rear side, on the inner surface of the receiving region 30 of the plug-on section 20. The bow spring element 46 comprises a pedestal 50, which is configured to adjoin the inner surface of the receiving region 30 of the plug-on section 20. The bow spring element 46 is supported via the pedestal 50 exteriorly on its arc at the inner side of the receiving region 30 of the plug-on section 20. The pedestal 50 is in particular arranged on an outer side of the arc of the bow spring element 46. The pedestal 50 is embodied by a rectangular pedestal 50. The pedestal 50 forms an elevation with respect to a basic shape of the bow spring element 46. The pedestal 50 realizes a point of the bow spring element 46 that is the farthest away from a middle axis of the interface accommodation unit 24. The pedestal 50 has a length of 1 mm to 4.5 mm, preferably of 2.5 mm to 3.5 mm. The pedestal 50 further has a width of 1 mm to 3.5 mm, preferably of 1.5 mm to 2.5 mm. The pedestal 50 of the bow spring element 46 serves for a precise support of the bow spring element 46 in the receiving region 30 of the plug-on section 20 of the application unit 14. Furthermore, the pedestal 50 forms a support point of the clamping element with the spring bar element 44 and the bow spring element 46. Via the pedestal 50 of the bow spring element 46, a force can be adjusted which eventually acts onto the interface 28 of the toothbrush handpiece 12. It is for example possible to generate a greater force by an increased height of the pedestal 50 as the bow spring element 46 is in the mounted state pushed toward the interface accommodation 26.

The spring bar element 44 comprises a pedestal 52 which is configured to introduce a clamping force of the spring section 42 onto the interface 28 of the toothbrush handpiece 12. The spring bar element 44 is supported, at an inside, by the pedestal 52 on the interface 28 of the toothbrush handpiece 12. The pedestal 52 is embodied by a rectangular pedestal 52. The pedestal 52 forms an elevation relative to a basic shape of the spring bar element 44. The pedestal 52 realizes a point of the spring bar element 44 that is closest to the middle axis of the interface accommodation unit 24. The pedestal 52 has a length of 1.5 mm to 4.5 mm, preferably of 2.5 mm to 3.5 mm. Furthermore, the pedestal 52 has a width of 1 mm to 3.5 mm, preferably of 1.5 mm to 2.5 mm. The pedestal 52 is arranged directly adjacent to a connection point of the bow spring element 46 to the spring bar element 44. The pedestal 52 is arranged on a side of the spring bar element 44 that faces away from the bow spring element 46. The position and/or the shape of the pedestal 52 are/is adapted to the interface 28 of the toothbrush handpiece 123. The pedestal 52 must fit onto the corresponding fluted surface of the interface 28. The pedestal 52 serves as a contact point to the interface 28 of the toothbrush handpiece 12. Via the pedestal 52, a clamping force is introduced onto the interface 28. By means of the pedestal 52 in particular a great amount of force is projected onto a small surface.

The spring bar element 44 furthermore has a free end, which forms a spring tongue. The spring bar element 44 has a free rear end. An end of the spring bar element 44 facing toward the lower end is implemented free of a connection with the base body 48 of the interface accommodation unit 24. The spring bar element 44 forms a lance in a longitudinal direction. The spring bar element 44 forms a free-standing spring tongue behind a connection with the bow spring element 46. The spring tongue is shaped in such a way that the interface 28 of the toothbrush handpiece 12 is correctly inserted into the interface accommodation 26 without getting hooked in the spring geometry. Furthermore, a centering of the interface 28 of the toothbrush handpiece 12 may be supported.

Different variants of a bristle field 54a, 54b, 54c are conceivable for the brush head 18. An implementation of the bristle field 54a, 54b, 54c is herein independent from a remaining construction of the brush head 18. In FIGS. 31 to 36 two further variants of a bristle field 54b, 54c are illustrated. The following descriptions are essentially limited to the differences between the bristle fields 54a, 54b, 54c, wherein regarding components, features and functions that remain the same, the description of the first variant of the bristle field 54a, in particular of FIGS. 1 to 30, may be referred to. In order to distinguish between the variants of bristle fields 54a, 54b, 54c, the letter a that was added to the reference numerals of the bristle field 54a in FIGS. 1 to 30 has been substituted by the letters b and c in the reference numerals of the bristle fields 54b, 54c of FIGS. 31 to 36.

Regarding components having the same denomination, in particular regarding components having the same reference numerals, principally the drawings and/or the description of the other variants, in particular of FIGS. 1 to 30, may be referred to.

In both variants the brush head 18 comprises a defined bristle field 54b, 54c. The brush head 18 comprises a perforated field 84b, 84c, which is the same in both variants. An illustrated perforated field 84b, 84c of the brush head 18 is—as shown—designed for applying an anchor-free punching method in order to form bristle bundles 86b, 86c, in particular by an anchor-free hot-tufting method.

The perforated field 84b, 84c has a great variety of cross-section shapes for bristle bundles 86b, 86c. The perforated field 84b, 84c has along the main extension direction 32, i.e. along the longitudinal axis, drop-shaped bristle bundles 86b, 86c. The tips of the drops respectively point to the interior of the perforated field 84b, 84c. In the front region two drops are arranged behind each other, in the rear region one drop is arranged. Herein the largest drops are arranged at the periphery of the bristle field 54b, 54c, respectively of the perforated field 84b, 84c.

Between the drops, directly at the main extension direction 32, respectively symmetrically to the main extension direction 32, four bristle bundles 86b, 86c are arranged which are shaped like rectangular trapezoids. The arrangement of the trapezoids with respect to the main extension direction 32 is symmetrical, and the trapezoids are also arranged opposite each other and symmetrically with respect to an axis that is transversal to the main extension direction 32. The respectively rectangular corners are arranged at the main extension direction 32.

Beyond this the perforated field 84b, 84c comprises sidewise, respectively at the edges of the bristle field 54b, 54c, further bristle bundles 86b, 86c, which extend sidewise between the foremost and the rearmost drop-shaped bristle bundle 86b, 86c, thus forming a lateral outer contour of the bristle field 86b, 86c. The lateral bristle bundles 86b, 86c are shaped symmetrically to the main extension direction 32. In the front region, next to the second drop, on each side two elongate bristle bundles 86b, 86c are formed which are arranged in a ray shape and which start from the second drop. Beside the trapezoid-shaped bristle bundles 86b, 86c, which form quasi two transversal rows, on the righthand side and on the lefthand side respectively one bristle bundle 86b, 86c is formed. Beside the rear drop-shaped bristle bundle 86b, 86c, on the righthand side and on the lefthand side a ray-shaped bristle bundle 86b, 86c is formed, which starts from the drop.

A difference between the bristle field variants 54b, 54c is based on the realized profile of the bristle field. For both bristle fields 54b, 54c applies that they have an elevation at a front end and at a rear end. The frontal elevation is implemented so as to have at most the same height as the rear elevation; preferably the frontal elevation is higher than the rear elevation.

In the one bristle field variant 54b, in particular of FIGS. 31, 32, and 33, the in-between profile is implemented in such a way that a deepening is formed. The deepening is also realized in a transversal direction, as a result of which there is in total a tub-like deepening.

In the further bristle field variant 54c, in particular of FIGS. 34, 35 and 36, the profile between the frontal elevation and the rear elevation is realized such that there is a further elevation in a side view. All in all, this results in a wave-like profile. The further elevation is formed by the trapezoid-shaped bristle bundles 86c. The trapezoid-shaped bristle bundles 86c form an elevation towards their center (intersection line of the symmetries).

In both cases the profiling extends over the different bristle bundles 86b, 86c, the profiling is continued across the bristle bundles 86b, 86c.

The descriptions provided for specific figures are of course also transferable to further figures showing identical or similar implementations and in which the implementations are not described in such detail.

REFERENCE NUMERALS 10 plug-on brush device
12 toothbrush handpiece
14 application unit
16 head section
18 brush head
20 plug-on section
22 neck section
24 interface accommodation unit
26 interface accommodation
28 interface
30 receiving region
32 main extension direction
34 extent
36 extent
38 first fixing region
40 second fixing region
42 spring section
44 spring bar element
46 bow spring element
48 base body
50 pedestal
52 pedestal
54 bristle field
56 base body
58 ring
60 recess
62 second sub-receiving region
64 fourth sub-receiving region
66 first sub-receiving region
68 third sub-receiving region
70 fifth sub-receiving region
72 first partial region
74 second partial region
76 pedestal
78 first partial region
80 second partial region
82 protuberance
84 perforated field
86 bristle bundle

The invention claimed is:

1. A plug-on brush device for a toothbrush handpiece, the plug-on brush device comprising an application unit comprising a head section with a brush head, a plug-on section and a neck section that is arranged between the head section and the plug-on section, and an interface accommodation unit which is configured to receive at least one interface of the toothbrush handpiece,
   wherein
   the interface accommodation unit is realized separately and the plug-on section of the application unit comprises a receiving region for receiving the interface accommodation unit completely in a loss-proof manner, the receiving region of the application unit comprises five sub-receiving regions which are arranged behind one another along a main extension direction, and the interface accommodation unit comprises at least one first fixing region, which is configured for a direct contact with the receiving region of the plug-on section, and which has an at least approximately triangular cross section.

2. The plug-on brush device according to claim 1, having the main extension direction, wherein an extent of the receiving region of the plug-on section along the main extension direction is greater than an extent of the interface accommodation unit along the main extension direction.

3. The plug-on brush device according to claim 1, wherein the interface accommodation unit is realized in a one-part implementation and is made of a material that differs from the application unit.

4. The plug-on brush device according to claim 1, wherein the interface accommodation unit comprises at least one second fixing region, which is spaced apart from the first fixing region, which is configured for a direct contact with the receiving region of the plug-on section, and which has an at least approximately triangular cross section, the cross section of the second fixing region being rotated with respect to the cross section of the first fixing region.

5. The plug-on brush device according to claim 1, wherein the interface accommodation unit comprises at least one spring section which is configured, in a state when an interface of the toothbrush handpiece is accommodated, to exert a tension force onto the interface of the toothbrush handpiece, and the spring section is realized by a spring zone which is arranged between the first fixing region of the interface accommodation unit and a second fixing region of the interface accommodation unit.

6. The plug-on brush device according to claim 5, wherein the spring section comprises at least one spring bar element and at least one bow spring element, each of which is configured, in a state when an interface of the toothbrush handpiece is accommodated, to exert a tension force onto the interface of the toothbrush handpiece.

7. The plug-on brush device according to claim 6, wherein the at least one spring bar element and the at least one bow spring element are implemented integrally.

8. The plug-on brush device according to claim 6, wherein the at least one spring bar element and the at least one bow spring element are in each case with one end connected to a base body of the interface accommodation unit, wherein the ends face away from each other.

9. The plug-on brush device according to claim 6, wherein the at least one bow spring element is configured to be supported on an inner surface of a receiving region of the plug-on section.

10. The plug-on brush device according to claim 9, wherein the at least one bow spring element comprises at least one pedestal, which is configured to adjoin the inner surface of the receiving region of the plug-on section.

11. The plug-on brush device according to claim 6, wherein the at least one spring bar element has a free end which forms a spring tongue.

12. The plug-on brush device according to claim 6, wherein the at least one spring bar element comprises at least one pedestal, which is configured to introduce a clamping force of the spring section onto the interface of the toothbrush handpiece.

13. An electrical toothbrush with an electrical toothbrush handpiece and with a plug-on brush device with an application unit comprising a head section with a brush head, a plug-on section and a neck section that is arranged between the head section and the plug-on section, and with an interface accommodation unit which is configured to receive at least one interface of a toothbrush handpiece, wherein the interface accommodation unit is realized separately and the plug-on section of the application unit comprises a receiving region for receiving the interface accommodation unit completely in a loss-proof manner, the receiving region of the application unit comprises five sub-receiving regions which are arranged behind one another along the main extension direction, and the interface accommodation unit comprises at least one first fixing region, which is configured for a direct contact with the receiving region of the plug-on section, and which has an at least approximately triangular cross section.

* * * * *